United States Patent
Sato et al.

(10) Patent No.: US 8,979,125 B2
(45) Date of Patent: Mar. 17, 2015

(54) CONSTRUCTION MACHINE

(75) Inventors: Kensuke Sato, Ushiku (JP); Tsuyoshi Nakamura, Tsuchiura (JP); Takahiro Kobayashi, Tsuchiura (JP); Hiroyuki Azuma, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/997,321

(22) PCT Filed: Jan. 6, 2012

(86) PCT No.: PCT/JP2012/050159
§ 371 (c)(1),
(2), (4) Date: Jun. 24, 2013

(87) PCT Pub. No.: WO2012/114783
PCT Pub. Date: Aug. 30, 2012

(65) Prior Publication Data
US 2013/0343853 A1 Dec. 26, 2013

(30) Foreign Application Priority Data
Feb. 25, 2011 (JP) ................................. 2011-039765

(51) Int. Cl.
*B60K 13/04* (2006.01)
*E02F 9/08* (2006.01)
*E02F 9/18* (2006.01)
*E02F 3/30* (2006.01)
*B62D 49/08* (2006.01)

(52) U.S. Cl.
CPC .................. *E02F 9/0866* (2013.01); *E02F 9/18* (2013.01); *E02F 3/30* (2013.01); *B62D 49/085* (2013.01)
USPC .......... 280/759; 248/675; 180/196; 180/89.2; 414/719

(58) Field of Classification Search
CPC ..... B62D 49/085; B62D 49/0628; E02F 9/18; E02F 9/0866; E02F 3/30; B66F 9/07554; B60K 13/04; F01N 13/1822; F01N 13/1805; F01N 13/082

USPC .......... 280/759, 757; 180/296, 89.2; 248/675, 248/674; 414/719
See application file for complete search history.

(56) References Cited

U.S. PATENT DOCUMENTS

| 2010/0192551 A1* | 8/2010 | Yokota ............................ 60/295 |
| 2011/0005853 A1 | 1/2011 | Kamiya |
| 2013/0343853 A1* | 12/2013 | Sato et al. ..................... 414/719 |

FOREIGN PATENT DOCUMENTS

| JP | 2003-041627 A | 2/2003 |
| JP | 2008-231757 A | 10/2008 |
| JP | 2009-184558 A | 8/2009 |

OTHER PUBLICATIONS

Numata et al. JP 2003-041627 English Machine Translation. Printed Jun. 30, 2014.*

*Primary Examiner* — Karen Beck
(74) *Attorney, Agent, or Firm* — Mattingly & Malur, PC

(57) ABSTRACT

On a rear part side of a revolving frame (5) constituting an upper revolving structure (3), a counterweight (7) holding weight balance with a working mechanism (4) is provided, and on the front side of the counterweight (7), an engine (9) and an exhaust gas post-treatment device (21) for applying purification treatment to an exhaust gas of the engine (9) are provided. The exhaust gas post-treatment device (21) is configured by connecting a PM trapping filter device (22) and an NOx purifying device (23), and the PM trapping filter device (22) is mounted on the engine (9), while the NOx purifying device (23) is mounted on the counterweight (7). When the counterweight (7) is to be removed from the revolving frame (5), the NOx purifying device (23) is supported by a treatment device support bracket (26) mounted on the engine (9). As a result, the counterweight (7) can be removed while the PM trapping filter device (22) and the NOx purifying device (23) are connected.

5 Claims, 15 Drawing Sheets

CONSTRUCTION MACHINE

TECHNICAL FIELD

The present invention relates to a construction machine such as a hydraulic excavator and particularly to a construction machine on which an exhaust gas post-treatment device for purification treatment of exhaust gas exhausted from an engine is mounted.

BACKGROUND ART

In general, a hydraulic excavator which is a typical example of a construction machine has a vehicle body composed of an automotive lower traveling structure and an upper revolving structure rotatably mounted on the lower traveling structure. A working mechanism for carrying out an excavating work or the like is liftably provided on the front part side of the upper revolving structure.

The upper revolving structure has a revolving frame forming a firm support structural body, the working mechanism is mounted on the front end side of the revolving frame, and a counterweight holding weight balance with the working mechanism is removably mounted on the rear end side. An engine for driving a hydraulic pump is mounted on the revolving frame, as locating on the front side of the counterweight.

Here, a diesel engine is generally used for the engine of the hydraulic excavator. This diesel engine exhausts harmful substances such as particulate matter (PM), nitrogen oxides (NOx) and the like. Thus, in the hydraulic excavator, an exhaust gas post-treatment device for applying purification treatment of the exhaust gas is provided in the middle of an exhaust gas passage of the engine.

This exhaust gas post-treatment device is composed of treatment devices such as a particulate matter trapping filter device (hereinafter referred to as a PM trapping filter device) for trapping and removing the particulate matter (PM) in the exhaust gas, a nitrogen oxide purifying device (hereinafter referred to as an NOx purifying device) for purifying the nitrogen oxides (NOx) by using a urea water solution or a selective reduction catalyst, oxidation catalyst for oxidation removal of carbon monoxide (CO) and hydrocarbon (HC) and the like.

Incidentally, in a hydraulic excavator of a rear small-revolving type suitably used for an excavating work in an urban district and the like, a counterweight is arranged close to the revolving center in order to keep a revolving radius of the upper revolving structure small. Thus, a device accommodating space formed on the front side of the counterweight becomes narrow, and it is difficult to accommodate treatment devices such as the PM trapping filter device, the NOx purifying device and the like constituting the exhaust gas post-treatment device other than devices such as an engine, a heat exchanger and the like in this narrow device accommodating space.

In order to handle this difficulty, a hydraulic excavator in which a recessed portion is provided on the upper surface side of the counterweight is proposed. This hydraulic excavator has the PM trapping filter device fixed to the engine disposed on the front side of the counterweight and the NOx purifying device fixed to the recessed portion of the counterweight (Patent Document 1).

In this hydraulic excavator according to a conventional art, an exhaust pipe of an engine is connected to the PM trapping filter device, and the PM trapping filter device and the NOx purifying device are connected to each other through a pipe. It is so configured that the particulate matter contained in the exhaust gas from the engine is trapped by the PM trapping filter device and the nitrogen oxides in the exhaust gas is purified by the NOx purifying device.

PRIOR ART DOCUMENT

Patent Document

Patent Document 1: Japanese Patent Laid-Open No. 2009-184558 A

SUMMARY OF THE INVENTION

Incidentally, when the hydraulic excavator is transported to a work site or the like, such a method is employed that the working mechanism and the counterweight which are heavy articles are usually removed from a vehicle body (the upper revolving structure) and these working mechanism, the counterweight, and the vehicle body are loaded individually on a transport vehicle such as a trailer and transported to the work site.

Here, when the vehicle body from which the working mechanism and the counterweight have been removed is to be loaded on the transport vehicle, the engine of the vehicle body is operated while the working mechanism and the counterweight are removed. After that, the vehicle body is self-propelled to a loading platform of the transport vehicle by driving the lower traveling structure, and the vehicle body is fixed to the loading platform.

In the hydraulic excavator according to the above described conventional art, the PM trapping filter device constituting the exhaust gas post-treatment device is mounted on the engine, and the NOx purifying device is mounted on the counterweight. Therefore, in this hydraulic excavator, the NOx purifying device has to be removed from the PM trapping filter device at a stage prior to removal of the counterweight from the vehicle body.

However, in the case of the hydraulic excavator on which the exhaust gas post-treatment device is mounted, it is usually configured that, if any one of the various treatment devices constituting the exhaust gas post-treatment device is removed from an exhaust passage of the engine, that is, if it is detected that the exhaust gas post-treatment device is not properly functioning, operation of the engine is not allowed or an alarm sound is emitted. Thus, there is a problem that a loading work becomes difficult if the vehicle body from which the counterweight has been removed is to be self-propelled and loaded on the transport vehicle.

Moreover, when the counterweight is to be removed from the vehicle body, a work of removing the NOx purifying device from the PM trapping filter device (removal from the exhaust passage of the engine) is required. On the other hand, when the counterweight is to be mounted on the vehicle body, a work of connecting the NOx purifying device to the PM trapping filter device (incorporating into the exhaust passage of the engine) is required. As described above, when the hydraulic excavator according to the conventional art is transported, troublesome works such as attachment/removal of the NOx purifying device to/from the PM trapping filter device are involved. Therefore, there is a problem that workability when the hydraulic excavator is transported to the work site is lowered.

In view of the above-described conventional art problems, it is an object of the present invention to provide a construction machine in which the exhaust gas post-treatment device can properly function even if the counterweight is removed from the vehicle body.

(1) In order to solve the above described problems, the present invention is applied to a construction machine comprising: an automotive vehicle body; a working mechanism provided on the front part side of the vehicle body; a counterweight removably provided on the rear part side of the vehicle body in order to hold weight balance with the working mechanism; an engine mounted on the vehicle body located on the front side of the counterweight; and an exhaust gas post-treatment device provided in the middle of an exhaust gas passage of the engine and configured to apply purification treatment to an exhaust gas by using a single treatment device or by connecting a plurality of treatment devices.

A characteristic of the present invention is that at least one treatment device constituting the exhaust gas post-treatment device is configured to be fixed to the counterweight when the counterweight is mounted on the vehicle body; and a treatment device support member for supporting the at least one treatment device is provided on one member of the engine and the vehicle body when the counterweight is removed from the vehicle body.

With this arrangement, in a state in which the counterweight is mounted on the vehicle body while the construction machine is operating, at least one treatment device in the treatment devices constituting the exhaust gas post-treatment device can be mounted on the counterweight. On the other hand, when the counterweight is to be removed from the vehicle body in transport of the construction machine or the like, the treatment device mounted on the counterweight can be supported by the treatment device support member provided on one member of the engine and the vehicle body. Therefore, even if the counterweight has been removed from the vehicle body, there is no need to remove the treatment device from the exhaust passage of the engine, and the exhaust gas post-treatment device can properly function all the time.

As a result, in transport of the construction machine, for example, even in a state in which the counterweight is removed from the vehicle body, by normally operating the engine, the vehicle body of the construction machine can be self-propelled to the loading platform of the transport vehicle. Moreover, a work of removing the treatment device from the exhaust passage of the engine when the counterweight is to be removed from the vehicle body and a work of incorporating the treatment device in the exhaust passage of the engine when the counterweight is to be mounted on the vehicle body can be made unnecessary. Therefore, workability when transporting the construction machine to the work site can be improved.

(2) According to the present invention, the treatment device support member has a vehicle-body side fixing portion to be fixed to one member of the engine and the vehicle body and a weight-side fixing portion extending from the vehicle-body side fixing portion toward the counterweight; and it is so configured that when the counterweight is to be removed from the vehicle body, the vehicle-body side fixing portion of the treatment device support member is mounted on the one member, and the at least one treatment device is mounted on the weight-side fixing portion of the treatment device support member.

With this arrangement, by mounting the treatment device on the weight-side fixing portion of the treatment device support member while the vehicle-body side fixing portion of the treatment device support member is mounted on one member of the engine and the vehicle body, the treatment device having been mounted on the counterweight can be mounted on the one member through the treatment device support member. Therefore, at the stage prior to the removal of the counterweight from the vehicle body, the treatment device removed from the counterweight can be supported with respect to the one member, and thus, only the counterweight can be removed from the vehicle body while the treatment device is kept incorporated in the exhaust passage of the engine.

(3) According to the present invention, it is so configured that a support member storage portion for storing the treatment device support member removed from the one member of the engine and the vehicle body is provided on the counterweight when the counterweight is mounted on the vehicle body.

With this arrangement, even if it is no longer necessary to support the treatment device by the treatment device support member by mounting the counterweight on the vehicle body and by mounting the treatment device on this counterweight, the treatment device support member can be kept stored in the support member storage portion of the counterweight. As a result, loss of the treatment device support member can be reliably avoided, and when the counterweight is removed from the vehicle body, the treatment device can be reliably mounted on one member of the engine and the vehicle body by using the treatment device support member.

(4) According to the present invention, it is so configured that, between the one member of the engine and the vehicle body and the vehicle-body side fixing portion of the treatment device support member, a spacer that removably mounted between the both is provided; when the counterweight is removed from the vehicle body, the vehicle-body side fixing portion of the treatment device support member is mounted on the one member through the spacer, and the at least one treatment device is mounted on the weight-side fixing portion of the treatment device support member; and when the counterweight is mounted on the vehicle body, a gap is formed between the vehicle-body side fixing portion of the treatment device support member and the one member by removing the spacer, and the weight-side fixing portion of the treatment device support member is mounted on the counterweight together with the at least one treatment device.

With this arrangement, if the spacer is provided between the one member of the engine and the vehicle body and the vehicle-body side fixing portion of the treatment device support member, the vehicle-body side fixing portion of the treatment device support member can be integrally mounted on the one member. Moreover, if the spacer is removed from the space between the vehicle-body side fixing portion of the treatment device support member and the one member, the vehicle-body side fixing portion of the treatment device support member can be separated from the one member.

Therefore, by mounting the treatment device on the weight-side fixing portion of the treatment device support member in a state in which the spacer is provided between the vehicle-body side fixing portion of the treatment device support member and the one member, the treatment device can be easily mounted on the one member. As a result, the counterweight can be removed from the vehicle body. On the other hand, by mounting the weight-side fixing portion of the treatment device support member on the counterweight together with the treatment device in a state in which the spacer is removed from the space between the vehicle-body side fixing portion of the treatment device support member and the one member, the treatment device can be easily separated from the one member and mounted on the counterweight.

(5) According to the present invention, on the at least one treatment device, a first mounting leg portion mounted on the counterweight when the counterweight is mounted on the vehicle body and a second mounting leg portion arranged at a position different from that of the first mounting leg portion are provided; the treatment device support member has a support arm portion arranged by extending in the front-rear direction between the engine and the counterweight, the vehicle-body side fixing portion provided on the front side of the support arm portion and fixed to the one member of the engine and the vehicle body, and a weight-side fixing portion provided on the rear side of the support arm portion and fixed to the second mounting leg portion of the at least one treatment device; and it is so configured that, when the counterweight is to be removed from the vehicle body, the first mounting leg portion of the at least one treatment device is removed from the counterweight, and the second mounting leg portion is mounted on the weight-side fixing portion of the treatment device support member.

With this arrangement, in the state in which the counterweight is mounted on the vehicle body, the treatment device can be mounted on the counterweight by mounting the first mounting leg portion of the treatment device on the counterweight. On the other hand, in order to remove the counterweight from the vehicle body, the weight-side fixing portion of the treatment device support member can be mounted on the second mounting leg portion of the treatment device and the vehicle-body side fixing portion of the treatment device support member can be mounted on the one member while the first mounting leg portion of the treatment device is mounted on the counterweight.

Therefore, when the counterweight is to be removed from the vehicle body, the work of mounting the treatment device on the one member through the treatment device support member can be carried out in a state in which the weight of the treatment device is supported by the counterweight. As a result, the work of mounting the treatment device on the one member through the treatment device support member when the counterweight is to be removed from the vehicle body and the work of mounting the treatment device on the counterweight when the counterweight is to be mounted on the vehicle body can be carried out smoothly and safely, and the workability can be improved.

MODE FOR CARRYING OUT THE INVENTION

Hereinafter, embodiments of a construction machine according to the present invention will be described below in detail with reference to the accompanying drawings by using a case applied to a hydraulic excavator as an example.

First, FIGS. 1 to 7 illustrate a first embodiment of the present invention. In this embodiment, a hydraulic excavator provided with an exhaust gas post-treatment device composed of a PM trapping filter device for trapping and removing particulate matter (PM) in an exhaust gas and an NOx purifying device for purifying nitrogen oxides (NOx) in the exhaust gas by using urea water solution, a selective reduction catalyst and the like is illustrated.

Figure 1:
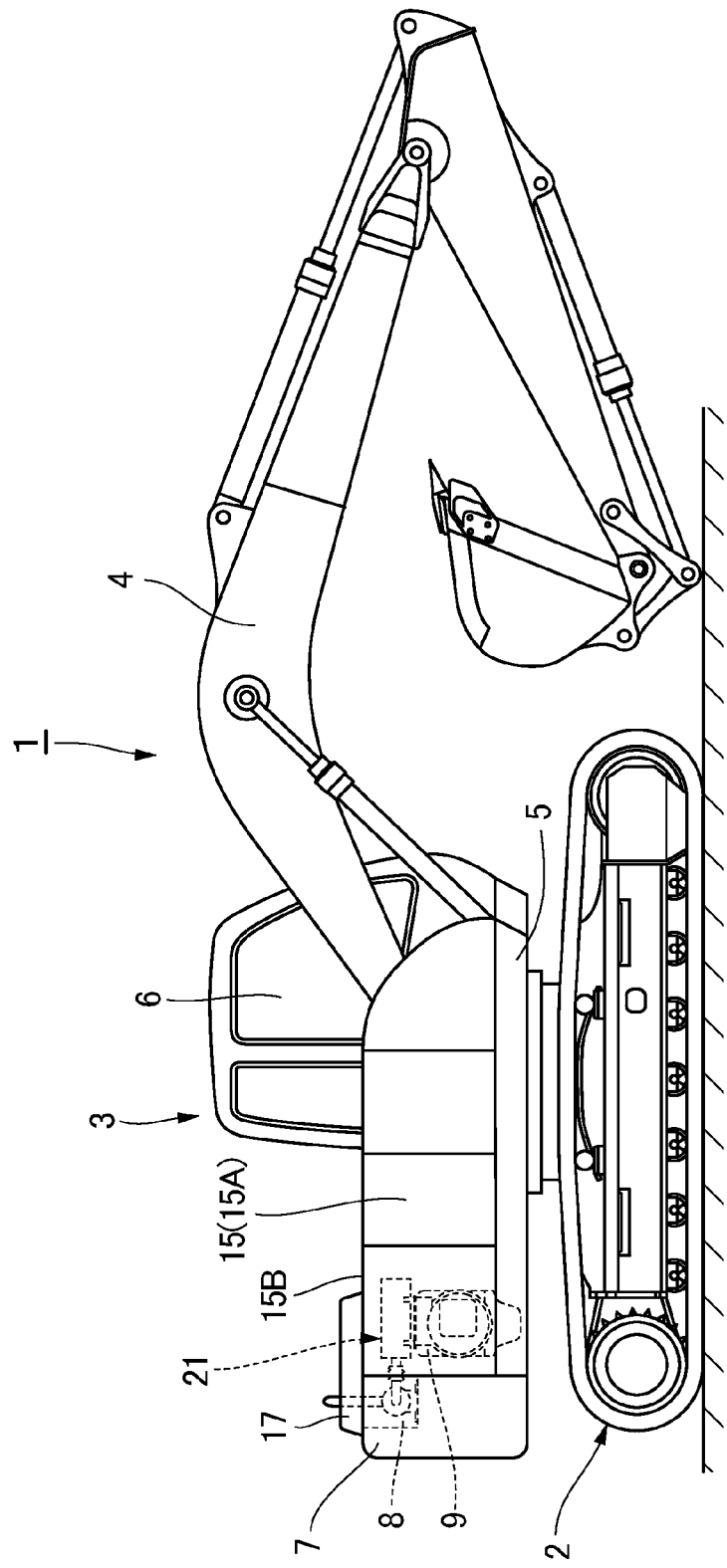
FIG. 1 is a side view illustrating a hydraulic excavator applied to a first embodiment of the present invention.

In FIG. 1, designated at 1 is a hydraulic excavator as a typical example of a construction machine, and a vehicle body of this hydraulic excavator 1 is composed of an automotive crawler-type lower traveling structure 2 and an upper revolving structure 3 rotatably mounted on the lower traveling structure 2. A working mechanism 4 is liftably provided on the front part side of the upper revolving structure 3, and the working mechanism 4 is to carry out an excavating work of earth and sand and the like. Here, the upper revolving structure 3 is composed of a revolving frame 5, a cab 6, an engine 9, an exhaust gas post-treatment device 21 which will be described later and the like.

Figure 2:
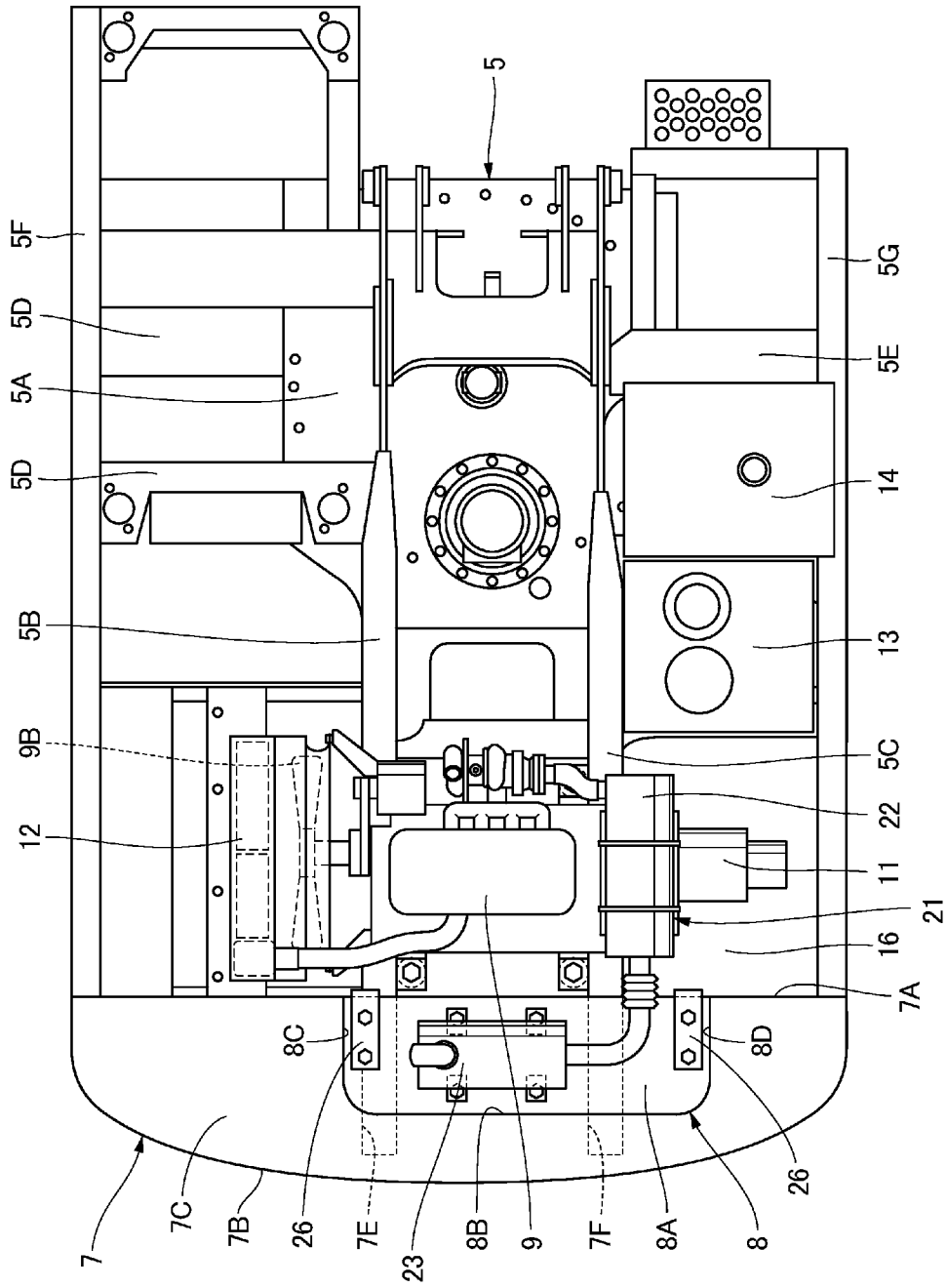
FIG. 2 is a plan view of the upper revolving structure illustrating a state in which a counterweight, an engine, an exhaust gas post-treatment device and the like are mounted on a revolving frame.

Indicated at 5 is the revolving frame which becomes abase for the upper revolving structure 3, and the revolving frame 5 forms a firm support structural body and is rotatably mounted on the lower traveling structure 2 through a revolving device (not shown). As illustrated in FIG. 2, the revolving frame 5 is composed of a thick bottom plate 5A extending in the front-rear direction, a left vertical plate 5B and a right vertical plate 5C installed upright on the bottom plate 5A and extending in the front-rear direction at a predetermined interval in the left-right direction, a plurality of left extension beams 5D extending in the left direction from the left vertical plate 5B, a plurality of right extension beams 5E extending in the right direction from the right vertical plate 5C, a left side frame 5F fixed to a distal end of each of the left extension beams 5D and extending in the front-rear direction, and a right side frame 5G fixed to a distal end of each of the right extension beams 5E and extending in the front-rear direction.

Figure 4:
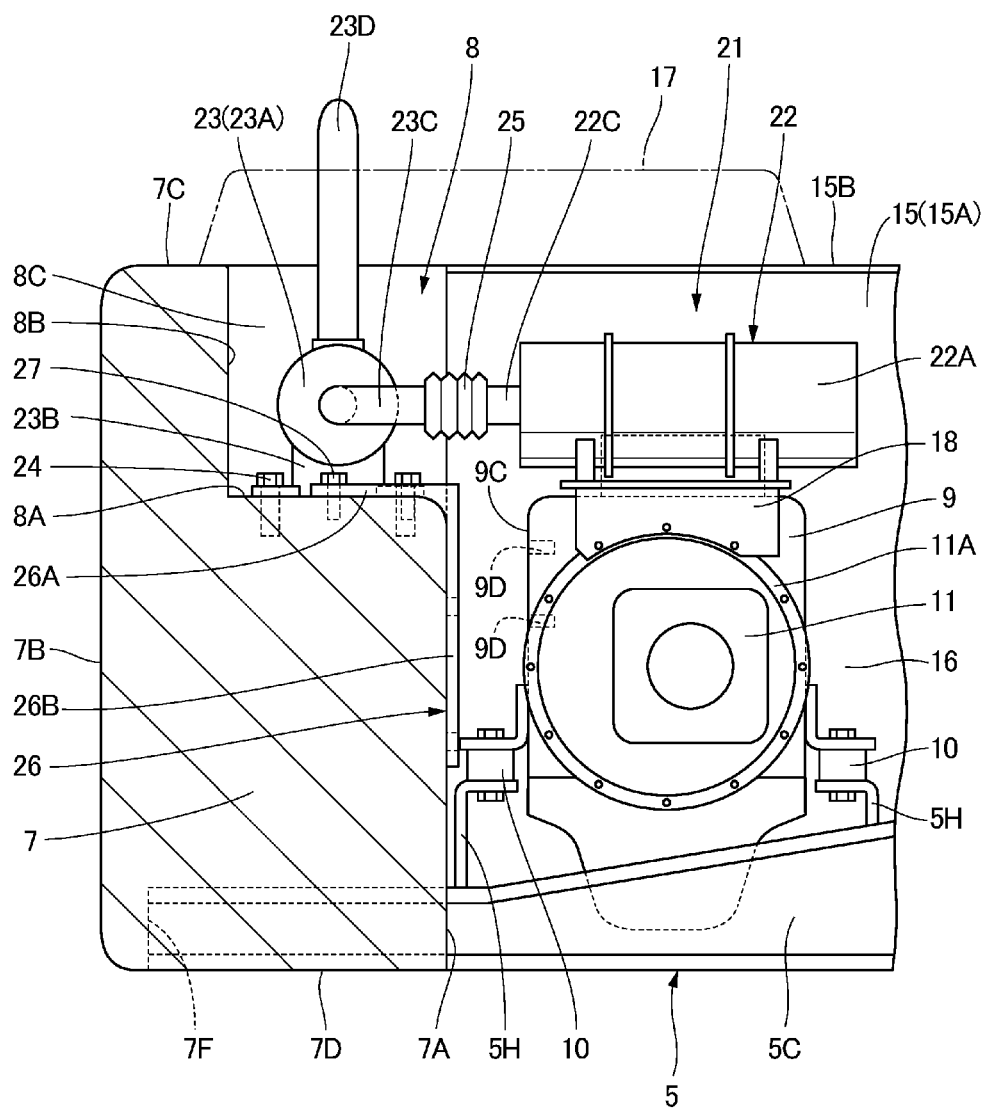
FIG. 4 is a sectional view of the engine, the PM trapping filter device, the NOx purifying device and the like when seen from an arrow IV-IV direction in FIG. 3.

A foot portion of the working mechanism 4 is liftably mounted on the front end portions of the left and right vertical plates 5B and 5C constituting the revolving frame 5, and a counterweight 7 which will be described later is mounted on the rear end portion of each of the vertical plates 5B and 5C. As illustrated in FIG. 4, on each of the vertical plates 5B and 5C, a plurality of engine support leg portions 5H located on the front side of the counterweight 7 and opposing in the front-rear direction are integrally fixed and provided. On each of these engine support leg portions 5H, the engine 9 which will be described later is supported.

As illustrated in FIG. 1, the cab 6 is mounted on the left front portion side of the revolving frame 5. This cab 6 is to define an operator's room, and inside the cab 6, an operator's seat on which an operator is seated, various operating levers (none of them is shown), and the like are disposed.

Designated at 7 is the counterweight mounted on the rear end portion of the revolving frame 5, and the counterweight 7 holds weight balance with the working mechanism 4. As illustrated in FIGS. 3 to 6, the counterweight 7 is integrally formed by using a casting unit, for example, and the counterweight 7 has a front surface 7A opposed to the engine 9 which will be described later and having a rectangular shaped vertical surface extending in the left-right direction, a rear surface 7B curved in an arc shape and extending in the left-right direction, an upper surface 7C, and a lower surface 7D.

On the lower end side of the counterweight 7, a left frame mounting recessed portion 7E and a right frame mounting recessed portion 7F opened to the front surface 7A and the lower surface 7D are recessed by notching the front surface 7A and the lower surface 7D toward the rear surface 7B. By mounting these left and right frame mounting recessed portions 7E and 7F on the rear end portions of the left and right vertical plates 5B and 5C of the revolving frame 5 by using a bolt and the like, the counterweight 7 is removably mounted on the rear end portion of the revolving frame 5.

When the hydraulic excavator 1 configured as above is to be loaded on a trailer or the like and to be transported to a work site, the counterweight 7 is removed from the revolving frame 5. This counterweight 7 is transported to the work site separately from the vehicle body of the hydraulic excavator 1 constituted by the lower traveling structure 2 and the upper revolving structure 3 and is mounted on the revolving frame 5 at the work site again.

Indicated at 8 is a recessed portion provided on the upper surface 7C side of the counterweight 7, and the recessed portion 8 is to accommodate an NOx purifying device 23 which will be described later. Here, the recessed portion 8 is formed as a rectangular shaped recessed portion surrounded by a bottom surface 8A, a rear surface 8B, a left surface 8C and a right surface 8D and extending in the left-right direction by notching the front surface 7A and the upper surface 7C of the counterweight 7, and this recessed portion 8 is opened to the front surface 7A and the upper surface 7C of the counterweight 7.

On the other hand, at the center part in the left-right direction of the bottom surface 8A, four center female screw holes 8E for fixing the NOx purifying device 23 which will be described later are threadedly provided. At the position in the vicinity of the left corner portion where the bottom surface 8A and the left surface 8C intersect each other, two left female screw holes 8F for fixing a treatment device support bracket 26 which will be described later are threadedly provided. At the position in the vicinity of the right corner portion where the bottom surface 8A and the right surface 8D intersect each other, two right female screw holes 8G for fixing the treatment device support bracket 26 which will be described later are threadedly provided. Therefore, in the first embodiment, the left female screw holes 8F and the right female screw holes 8G in the recessed portion 8 constitute a support member storage portion of the counterweight 7.

Indicated at 9 is the engine located on the front side of the counterweight 7 and mounted on the rear part side of the revolving frame 5, and this engine 9 is constituted by a diesel engine, for example. Here, the engine 9 is elastically supported by the engine support leg portion 5H provided on the rear part side of the revolving frame 5 through a vibration isolating mount member 10 and is arranged in a laterally placed state extending in the left-right direction as a whole.

This engine 9 is to drive a hydraulic pump 11 which will be described later, and it is so configured that the exhaust gas exhausted from the engine 9 is introduced into the exhaust gas post-treatment device 21 which will be described later through an exhaust pipe 9A constituting a part of an exhaust gas passage. On the left side of the engine 9, a cooling fan 9B rotated by the engine 9 is provided. On the other hand, on the engine 9, a bracket fixing surface 9C for fixing the treatment device support bracket 26 which will be described later is provided by being located on a portion opposite to the counterweight 7, and in the bracket fixing surface 9C, two female screw holes 9D are threadedly provided at an interval in the upper-lower direction.

The hydraulic pump 11 is mounted on the right side of the engine 9. This hydraulic pump 11 is to deliver pressure oil for operation toward various hydraulic actuators mounted on the hydraulic excavator 1 by being driven by the engine 9. Here, as illustrated in FIG. 4 and the like, the hydraulic pump 11 has a flange portion 11A bolted to the engine 9, and on this flange portion 11A, a support base 18 which will be described later is configured to be mounted.

A heat exchanger 12 is arranged opposite to the cooling fan 9B of the engine 9, and the heat exchanger 12 is composed of a radiator, an oil cooler, an intercooler and the like, for example. Here, the heat exchanger 12 is to cool engine cooling water, operating oil, and supercharged air by emitting heat of a coolant into cooling air generated by the cooling fan 9B while the engine 9 is operating.

An operating oil tank 13 is located on the front side of the hydraulic pump 11 and mounted on the right side of the revolving frame 5, and this operating oil tank 13 is to store operating oil to be supplied to various hydraulic actuators mounted on the hydraulic excavator 1. On the other hand, a fuel tank 14 is arranged on the front side of the operating oil tank 13, and this fuel tank 14 is to store fuel to be supplied to the engine 9.

Indicated at 15 is a housing cover located between the cab 6 and the counterweight 7 and provided on the revolving frame 5. The housing cover 15 is composed of left and right side plates 15A extending in the front-rear direction on the left and right side frames 5F and 5G of the revolving frame 5 and an upper plate 15B extending in the horizontal direction between the upper end portions of these left and right side plates 15A. The rear part side of the housing cover 15 is closed by the counterweight 7.

As a result, in the housing cover 15, an engine room 16 is located on the front side of the counterweight 7 and defined, and inside the engine room 16, the engine 9, the hydraulic pump 11, the heat exchanger 12, a PM trapping filter device 22 which will be described later and the like are accommodated. On the upper plate 15B of the housing cover 15, an opening portion (not shown) opened in the engine room 16 is formed, and an inspection work for the engine 9, the PM trapping filter device 22 and the like can be carried out through this opening portion.

An engine cover 17 is provided on the upper plate 15B of the housing cover 15, and the engine cover 17 is formed having a rectangular lid shape with the lower end portion opened. This engine cover 17 is supported on the upper plate 15B of the housing cover 15 through a hinge member. Here, the engine cover 17 is to cover the opening portion provided in the upper plate 15B of the housing cover 15 and the recessed portion 8 provided in the counterweight 7 capable of opening/closing.

The support base 18 is located on the right side of the engine 9 and is provided on the upper side of the hydraulic pump 11, and the support base 18 is mounted on the engine 9 together with the flange portion 11A of the hydraulic pump 11. On the upper surface side of the support base 18, the PM trapping filter device 22 which will be described later is configured to be supported.

Subsequently, the exhaust gas post-treatment device for applying purification treatment of the exhaust gas exhausted from the engine 9 will be described.

Designated at 21 is the exhaust gas post-treatment device connected to the exhaust pipe 9A of the engine 9. This exhaust gas post-treatment device 21 constitutes the exhaust gas passage together with the exhaust pipe 9A and removes harmful substances in the exhaust gas exhausted from the engine 9. Here, the exhaust gas post-treatment device 21 applied to the first embodiment is configured by connecting two treatment devices, that is, the PM trapping filter device 22 which will be described later mounted on the support base 18 and the NOx purifying device 23 which will be described later mounted on the recessed portion 8 of the counterweight 7 in series through a vibration absorbing pipe 25.

Designated at 22 is the PM trapping filter device which is one of the two treatment devices constituting the exhaust gas post-treatment device 21. This PM trapping filter device 22 is to trap particulate matter in the exhaust gas and is composed of a cylindrical case 22A having a cylindrical shape and a filter body (not shown) provided in this cylindrical case 22A.

Here, the cylindrical case 22A of the PM trapping filter device 22 is mounted on the support base 18 in a state in which its axial center line extends in the front-rear direction and is accommodated in the housing cover 15 together with the engine 9 and the hydraulic pump 11. On the outer periphery side of the front end portion of the cylindrical case 22A, an inlet pipe 22B connected to the exhaust pipe 9A of the engine 9 is provided. On the other hand, on the rear end portion of the cylindrical case 22A, an outlet pipe 22C projecting rearward to the counterweight 7 is provided, and this outlet pipe 22C is connected to an inlet pipe 23C of the NOx purifying device 23 which will be described later.

The PM trapping filter device 22 traps particulate matter contained in the exhaust gas introduced into the cylindrical case 22A through the inlet pipe 22B by the filter body and removes the trapped particulate matter by burning it. Therefore, the exhaust gas exhausted into the exhaust pipe 9A of the engine 9 is supplied to the NOx purifying device 23 which will be described later through the outlet pipe 22C in a state in which the particulate matter is removed by the PM trapping filter device 22.

Designated at 23 is the NOx purifying device which is the other of the two treatment devices constituting the exhaust gas post-treatment device 21. This NOx purifying device 23 is composed of a cylindrical case 23A having a cylindrical shape and a selective reduction catalyst (not shown) provided in this cylindrical case 23A. In the inlet pipe 23C which will be described later connected to the cylindrical case 23A, a urea water injection valve (not shown) is provided, and this urea water injection valve injects the urea water solution toward the exhaust gas introduced into the cylindrical case 23A through the inlet pipe 23C. Therefore, the selective reduction catalyst selectively reduces and reacts nitrogen oxides contained in the exhaust gas introduced into the cylindrical case 23A with ammonia generated from the urea water solution and decomposes it into nitrogen and water.

On the other hand, the cylindrical case 23A of the NOx purifying device 23 is arranged in the recessed portion 8 of the counterweight 7 in a state in which its axial center line extends in the left-right direction. On the lower surface side of the cylindrical case 23A, two mounting leg portions 23B are provided, and a bolt 24 inserted through the mounting leg portion 23B is screwed with the center female screw hole BE provided in the bottom surface 8A of the recessed portion 8. As a result, the NOx purifying device 23 is fixed on the bottom surface 8A of the recessed portion 8.

On the right end portion of the cylindrical case 23A, the L-shaped bent inlet pipe 23C is provided toward the PM trapping filter device 22, and the inlet pipe 23C is connected to the outlet pipe 22C provided on the cylindrical case 22A of the PM trapping filter device 22 through the vibration absorbing pipe 25. On the upper surface on the left end side of the cylindrical case 23A, an outlet pipe 23D extending upward is provided, and the exhaust gas purified in the NOx purifying device 23 is exhausted to the outside through the outlet pipe 23D.

The vibration absorbing pipe 25 is formed of a bellows pipe having flexibility. This vibration absorbing pipe 25 connects the outlet pipe 22C of the PM trapping filter device 22 and the inlet pipe 23C of the NOx purifying device 23 while absorbing a difference between vibration transmitted to the PM trapping filter device 22 mounted on the engine 9 through the support base 18 and vibration transmitted to the NOx purifying device 23 mounted on the recessed portion 8 of the counterweight 7. On the other hand, as illustrated in FIG. 4, the PM trapping filter device 22 mounted on the engine 9 and the NOx purifying device 23 mounted on the recessed portion 8 of the counterweight 7 are covered by the engine cover 17 capable of being opened/closed. The outlet pipe 23D of the NOx purifying device 23 is configured to protrude above the engine cover 17 when the engine cover 17 is closed.

As described above, the exhaust gas post-treatment device 21 exemplified in the first embodiment is constituted by the PM trapping filter device 22 and the NOx purifying device 23 provided in the middle of the exhaust gas passage of the engine 9, and the PM trapping filter device 22 is mounted on the engine 9 through the support base 18, while the NOx purifying device 23 is mounted on the recessed portion 8 of the counterweight 7.

Here, when the exhaust gas exhausted while the engine 9 is operating is introduced into the PM trapping filter device 22 through the inlet pipe 22B from the exhaust pipe 9A, the PM trapping filter device 22 traps and removes the particulate matter in the exhaust gas. When the exhaust gas from which the particulate matter has been removed is introduced into the NOx purifying device 23 through the outlet pipe 22C and the inlet pipe 23C, the NOx purifying device 23 is configured to decompose nitrogen oxides contained in the exhaust gas into nitrogen and water for purification and then, to exhaust them to the outside through the outlet pipe 23D.

In this case, the exhaust gas post-treatment device 21 is properly to function in a state in which the PM trapping filter device 22 and the NOx purifying device 23 are incorporated in the exhaust gas passage of the engine 9. Thus, in the exhaust gas post-treatment device 21, such a safety device is set that if the PM trapping filter device 22 or the NOx purifying device 23 is removed from the exhaust gas passage of the engine 9, start of the engine 9 is not allowed or an alarm sound is emitted, for example.

Subsequently, designated at 26 are two treatment device support brackets as treatment device support members used in the first embodiment. Each of these treatment device support brackets 26 is to support the NOx purifying device 23 having been mounted on the recessed portion 8 of the counterweight 7 on the engine 9 side instead of the counterweight 7, when the counterweight 7 is removed from the revolving frame 5.

Figure 5:
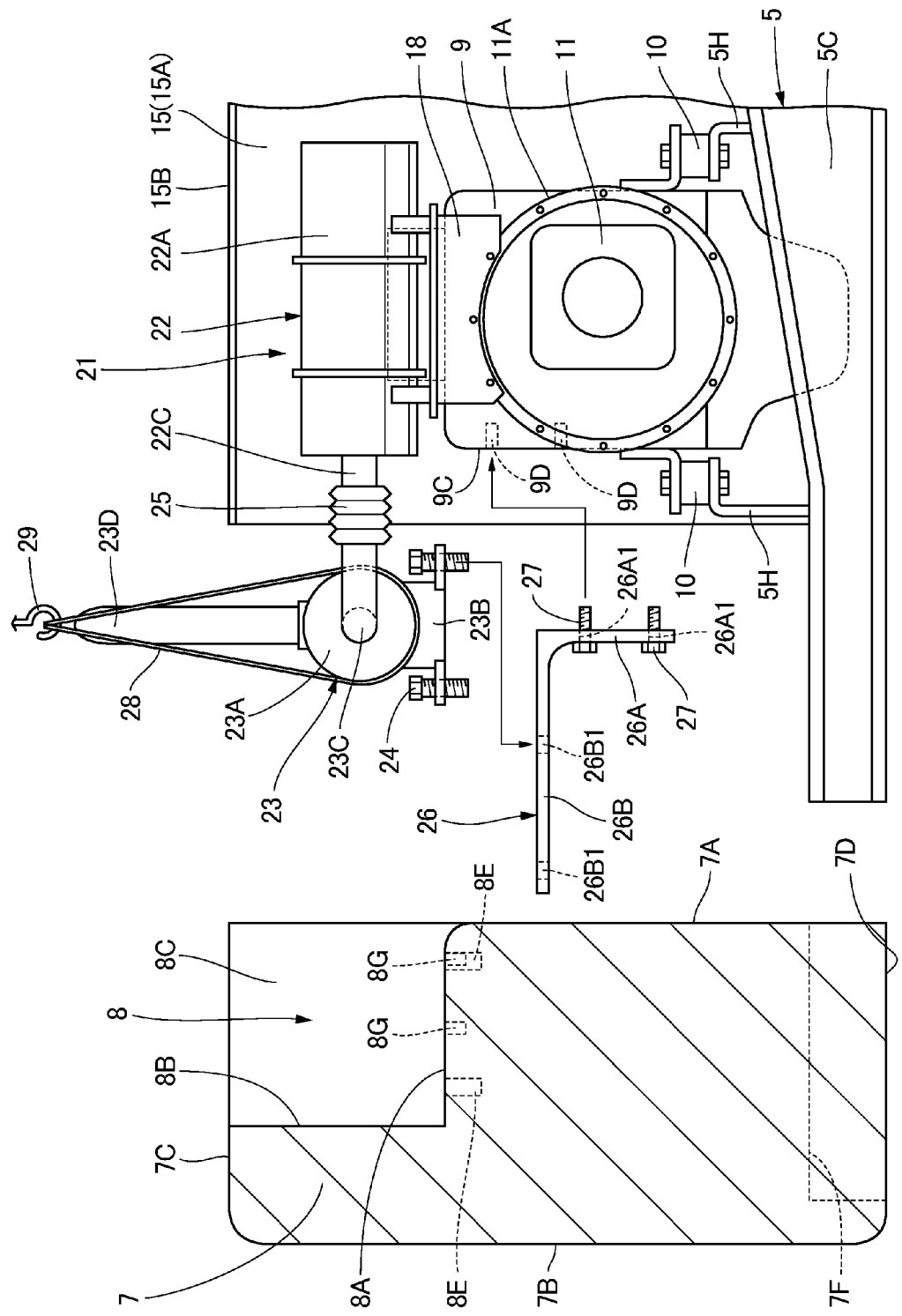
FIG. 5 is a sectional view similar to FIG. 4 illustrating a state in which the counterweight is removed from the revolving frame, and the NOx purifying device is mounted on the engine by using the treatment device support bracket.

As illustrated in FIG. 5, each of the treatment device support brackets 26 is constituted by an L-shaped bent thick plate body and has a short vehicle-body side fixing portion 26A fixed to the bracket fixing surface 9C of the engine 9 and a lengthy weight-side fixing portion 26B extending to the counterweight 7 side (rearward). In the vehicle-body side fixing portion 26A, two bolt through holes 26A1 corresponding to the female screw holes 9D of the engine 9, respectively, are drilled. In the weight-side fixing portion 26B, two female screw holes 26B1 corresponding to the mounting leg portions 23B of the NOx purifying device 23 are threadedly provided. In this case, when the treatment device support bracket 26 is mounted on the engine 9, a height position of the upper surface of the weight-side fixing portion 26B is set to a height position equal to the bottom surface 8A of the recessed portion 8.

When the counterweight 7 is to be removed from the revolving frame 5, a bolt 27 inserted through the bolt through hole 26A1 of the treatment device support bracket 26 is screwed in the female screw hole 9D of the engine 9, and the vehicle-body side fixing portion 26A of the treatment device support bracket 26 is mounted on the bracket fixing surface 9C of the engine 9. On the other hand, the bolt 24 inserted through the mounting leg portion 23B of the NOx purifying device 23 removed from the counterweight 7 is screwed in the female screw hole 26B1 of the treatment device support bracket 26, and the NOx purifying device 23 is mounted on the weight-side fixing portion 26B of the treatment device support bracket 26. As a result, when the counterweight 7 is removed, the NOx purifying device 23 is supported by the engine 9 through the treatment device support bracket 26 and incorporated in the exhaust gas passage of the engine 9 together with the PM trapping filter device 22.

Figure 3:
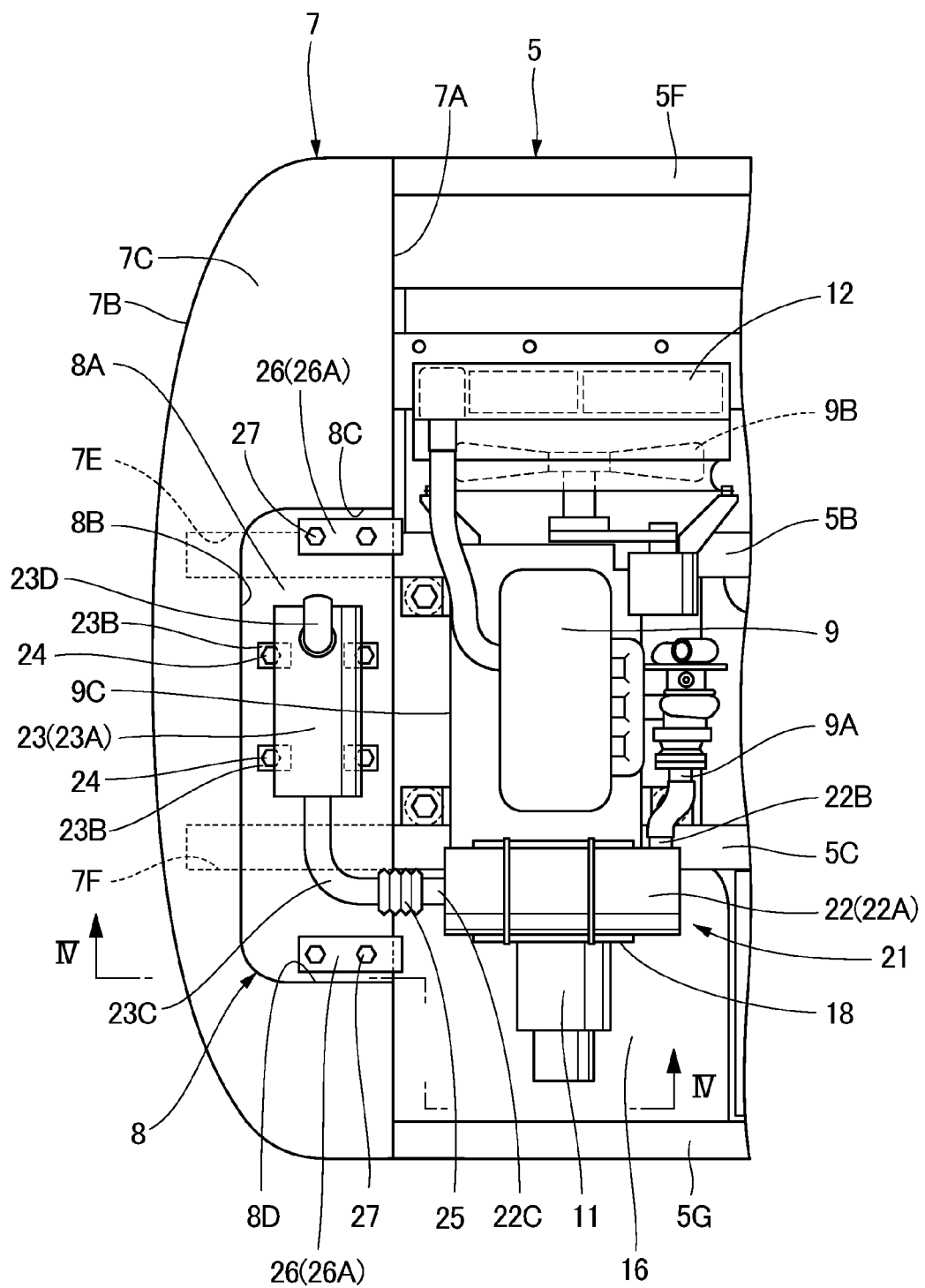
FIG. 3 is a plan view illustrating the engine, a PM trapping filter device, an NOx purifying device, a treatment device support bracket and the like in FIG. 2 in an enlarged manner.

On the other hand, as illustrated in FIG. 4, when the counterweight 7 is mounted on the revolving frame 5, the NOx purifying device 23 is mounted on the recessed portion 8 of the counterweight 7 by using the bolt 24, whereby it is incorporated in the exhaust gas passage of the engine 9 together with PM trapping filter device 22 and thus, the treatment device support bracket 26 is no longer necessary. In this case, after each of the treatment device support brackets 26 is removed from the engine 9, the bolt 27 inserted through the bolt through hole 26A1 of each of the treatment device support brackets 26 is screwed in the left and right female screw holes 8F and 8G provided in the recessed portion 8 of the counterweight 7. As a result, as illustrated in FIGS. 3 and 4, each of the treatment device support brackets 26 can be held in the vicinity of the left and right surfaces 8C and 8D of the recessed portion 8.

The hydraulic excavator 1 according to the first embodiment has the above described configuration, and subsequently, its operation and assembling of the exhaust gas post-treatment device 21 when the hydraulic excavator 1 is transported after the counterweight 7 is removed will be described. The hydraulic excavator 1 is self-propelled by the lower traveling structure 2 within the work site and performs an excavating work or the like by using the working mechanism 4 while revolving the upper revolving structure 3. In this state, the exhaust gas exhausted from the exhaust pipe 9A of the engine 9 is introduced into the PM trapping filter device 22 through the inlet pipe 22B, and the particulate matter is removed in the PM trapping filter device 22. After that, the exhaust gas is introduced into the NOx purifying device 23 through the outlet pipe 22C and the inlet pipe 23C, and the nitrogen oxides are decomposed in the NOx purifying device 23 into nitrogen and water. As described above, the exhaust gas exhausted from the engine 9 is purified by the exhaust gas post-treatment device 21 composed of the PM trapping filter device 22 and the NOx purifying device 23 and then, exhausted to the outside through the outlet pipe 23D of the NOx purifying device 23.

When the hydraulic excavator 1 as above is operating, an assembled state of the exhaust gas post-treatment device 21 will be described. That is, as illustrated in FIGS. 3 and 4, when the counterweight 7 is mounted on the revolving frame 5 of the hydraulic excavator 1, the PM trapping filter device 22 is mounted on the engine 9 through the support base 18. On the other hand, the NOx purifying device 23 is mounted on the recessed portion 8 of the counterweight 7 by using the bolt 24. The exhaust pipe 9A of the engine 9 is connected to the inlet pipe 22B of the PM trapping filter device 22, and the outlet pipe 22C of the PM trapping filter device 22 is connected to the inlet pipe 23C of the NOx purifying device 23 through the vibration absorbing pipe 25. At this time, the treatment device support bracket 26 is stored in the vicinity of the left and right surfaces 8C and 8D of the recessed portion 8 by screwing the bolt 27 inserted through the bolt through hole 26A1 with the left and right female screw holes 8F and 8G provided in the recessed portion 8 of the counterweight 7. As a result, loss of each of the treatment device support brackets 26 can be reliably prevented.

Next, a case in which the counterweight 7 is to be removed from the revolving frame 5, as illustrated in FIG. 5, in order to transport the hydraulic excavator 1 to a work site, for example, will be described. In this case, the bolt 24 for mounting the NOx purifying device 23 on the counterweight 7 (recessed portion 8) is withdrawn. Subsequently, a rope 28 is wound around the cylindrical case 23A of the NOx purifying device 23, and this rope 28 is lifted by using a crane 29. In this state, the counterweight 7 is removed from the revolving frame 5 by using another crane (not shown).

On the other hand, the bolt 27 is withdrawn from the counterweight 7, and the two treatment device support brackets 26 stored in the counterweight 7 are removed. The bolt 27 is inserted into the bolt through holes 26A1 of each of these treatment device support brackets 26, and this bolt 27 is screwed with the female screw hole 9D of the engine 9. As a result, the vehicle-body side fixing portion 26A of the treatment device support bracket 26 can be mounted on the bracket fixing surface 9C of the engine 9. At this time, a height position of the upper surface of the weight-side fixing portion 26B of the treatment device support bracket 26 is matched with the height position of the bottom surface 8A of the recessed portion 8 of the counterweight 7.

Figure 6:
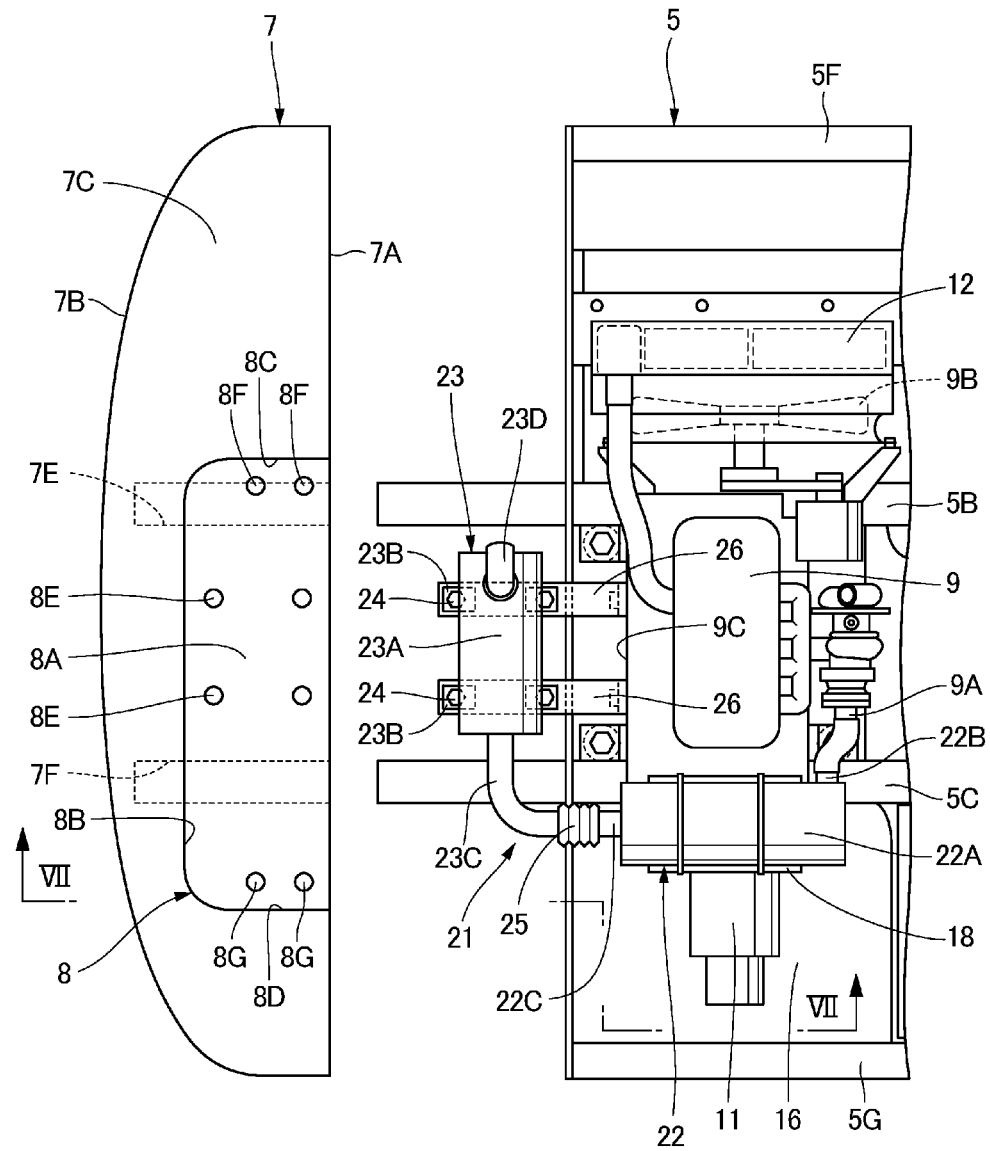
FIG. 6 is a plan view similar to FIG. 3 illustrating a state in which the counterweight is removed from the revolving frame.
Figure 7:
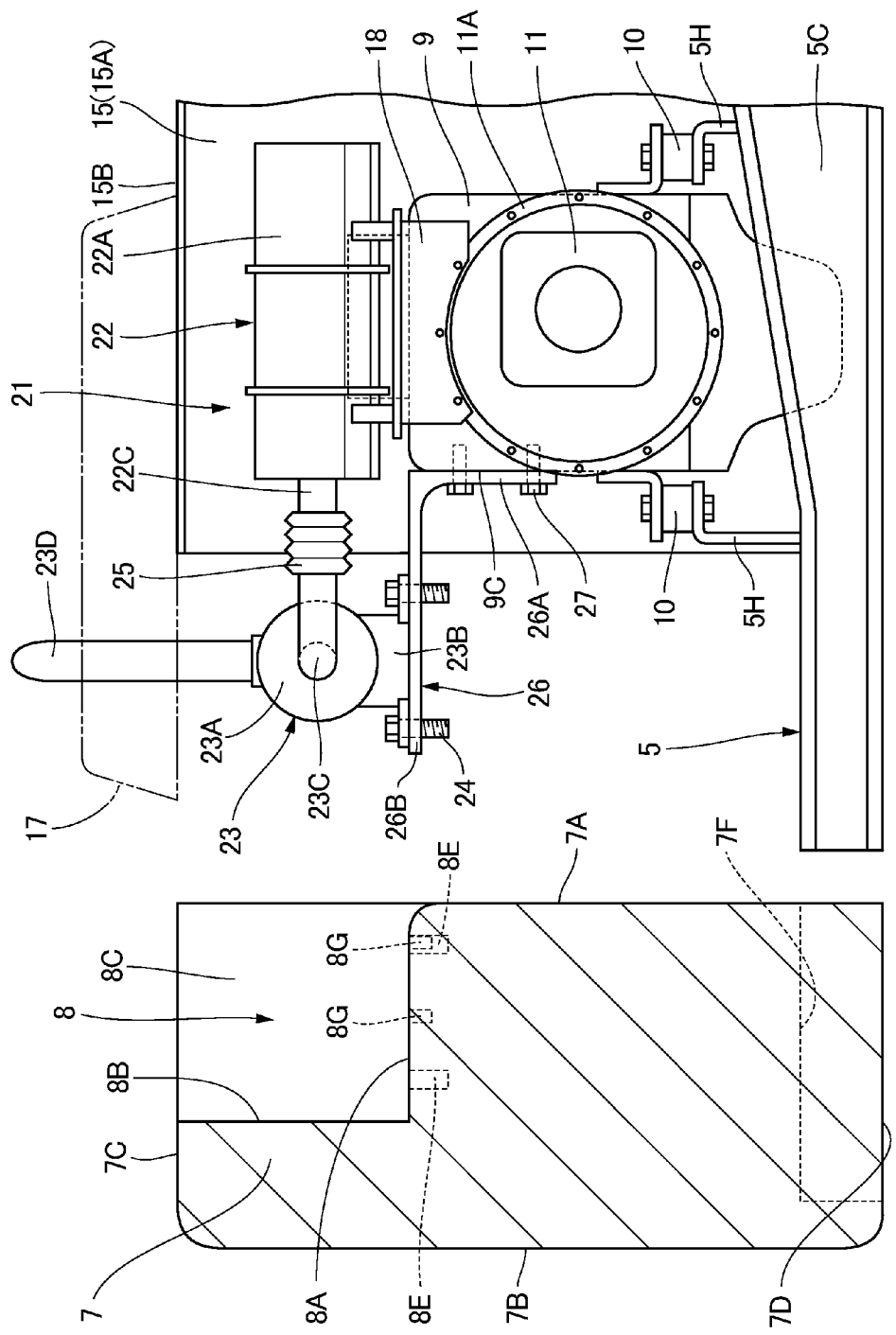
FIG. 7 is a sectional view of a state in which the PM trapping filter device, the NOx purifying device, and the treatment device support bracket are mounted on the engine when seen from an arrow VII-VII direction in FIG. 6.

Subsequently, while the outlet pipe 22C of the PM trapping filter device 22 and the inlet pipe 23C of the NOx purifying device 23 are connected to each other through the vibration absorbing pipe 25, the NOx purifying device 23 is moved onto the weight-side fixing portion 26B of each of the treatment device support brackets 26. Subsequently, the bolt 24 inserted through the mounting leg portion 23B of the NOx purifying device 23 is screwed with the female screw hole 26B1 of the treatment device support bracket 26. Therefore, as illustrated in FIGS. 6 and 7, the NOx purifying device 23 can be mounted on the weight-side fixing portion 26B of the treatment device support bracket 26, and the NOx purifying device 23 can be supported by the engine 9 through the treatment device support brackets 26.

As described above, the NOx purifying device 23 having been mounted on the counterweight 7 is mounted on the engine 9 by using the treatment device support bracket 26. As a result, even in a state in which the counterweight 7 is removed, the NOx purifying device 23 can be incorporated in the exhaust gas passage of the engine 9 together with the PM trapping filter device 22. In this case, the upper surface of the weight-side fixing portion 26B of the treatment device support bracket 26 is set to the height position equal to the bottom surface 8A of the recessed portion 8 of the counterweight 7. Therefore, the inlet pipe 23C of the NOx purifying device 23 supported by the treatment device support bracket 26 and the outlet pipe 22C of the PM trapping filter device 22 can be reliably connected through the vibration absorbing pipe 25.

As a result, even if the counterweight 7 is removed from the revolving frame 5, a state in which the exhaust gas post-treatment device 21 is properly functioning can be maintained, and start of the engine 9 is not prohibited or an alarm sound is not emitted.

Therefore, even in the state in which the counterweight 7 is removed, the hydraulic excavator 1 can be self-propelled to a loading platform of a transport vehicle such as a trailer or the like by operating the engine 9, and thus, workability when the hydraulic excavator 1 is loaded can be enhanced. On the other hand, even when the hydraulic excavator 1 is unloaded from the loading platform of the transport vehicle which arrived at the work site, the hydraulic excavator 1 can be self-propelled by operating the engine 9, and its workability can be enhanced.

Subsequently, a case in which the counterweight 7 is mounted on the revolving frame 5 of the hydraulic excavator 1 at a work site will be described. In this case, as illustrated in FIG. 5, the NOx purifying device 23 is lifted by using the rope 28 and the crane 29. Then, the NOx purifying device 23 is removed from the weight-side fixing portion 26B of each of the treatment device support brackets 26, and moreover, each of these treatment device support brackets 26 is removed from the bracket fixing surface 9C of the engine 9.

In this state, the counterweight 7 is mounted on the rear end portions of the left and right vertical plates 5B and 5C of the revolving frame 5. Then, the left and right frame mounting recessed portions 7E and 7F of the counterweight 7 are fastened by using a bolt or the like, whereby the counterweight 7 can be mounted on the revolving frame 5. Moreover, in order to mount the NOx purifying device 23 on the counterweight 7, the mounting leg portion 23B of the NOx purifying device 23 is arranged on the bottom surface 8A of the recessed portion 8 provided in the counterweight 7. After that, as illustrated in FIGS. 3 and 4, the bolt 24 inserted through the mounting leg portion 23B is screwed with the center female screw hole 8E of the recessed portion 8, whereby the NOx purifying device 23 can be mounted on the recessed portion 8 of the counterweight 7.

Thus, according to the first embodiment, when the counterweight 7 is to be removed from the revolving frame 5, the NOx purifying device 23 can be supported by the treatment device support bracket 26 mounted on the engine 9. Therefore, even if the counterweight 7 is removed from the revolving frame 5, the NOx purifying device 23 can be kept connected to the PM trapping filter device 22, and the exhaust gas post-treatment device 21 can be made to function properly all the time.

As a result, during transportation of the hydraulic excavator 1, for example, even in the state in which the counterweight 7 is removed from the revolving frame 5, the engine 9 can be operated reliably. Therefore, the vehicle body of the hydraulic excavator 1 can be self-propelled to the loading platform of the transport vehicle, and workability when the vehicle body of the hydraulic excavator 1 is to be loaded on the transport vehicle can be enhanced.

Moreover, the work of switching the NOx purifying device 23 mounted on the counterweight 7 to each of the treatment device support brackets 26 can be carried out in a state in which the outlet pipe 22C of the PM trapping filter device 22 and the inlet pipe 23C of the NOx purifying device 23 are connected through the vibration absorbing pipe 25. On the other hand, a work of mounting the NOx purifying device 23 mounted on each of the treatment device support brackets 26 to the counterweight 7 again can be also carried out in a state in which the outlet pipe 22C of the PM trapping filter device 22 and the inlet pipe 23C of the NOx purifying device 23 are connected through the vibration absorbing pipe 25. Therefore, when the counterweight 7 is mounted on/removed from the revolving frame 5, the work of mounting/removing the NOx purifying device 23 on/from the PM trapping filter device 22 can be made no longer necessary. As a result, workability when the hydraulic excavator 1 is transported to a work site can be enhanced.

Figure 8:
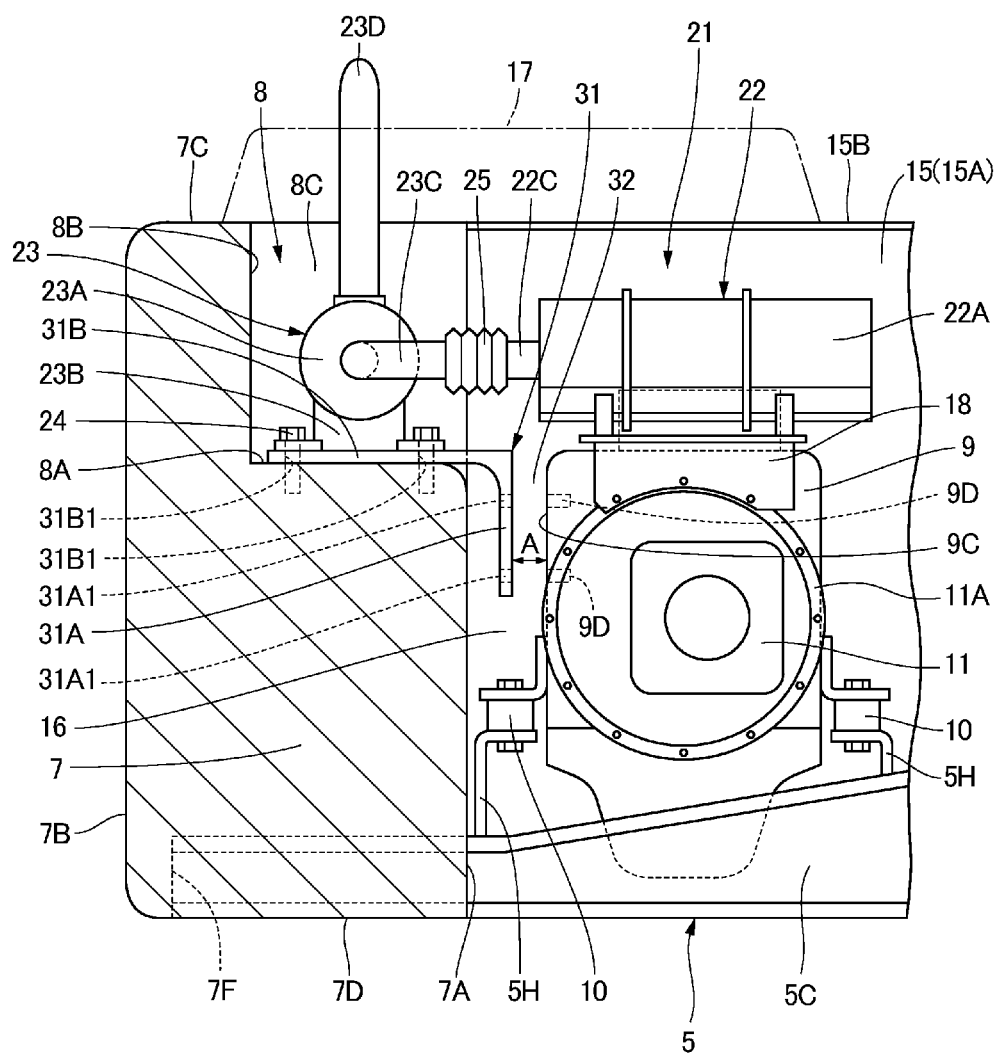
FIG. 8 is a sectional view similar to FIG. 4 illustrating the treatment device support bracket, the NOx purifying device and the like according to a second embodiment.
Figure 9:
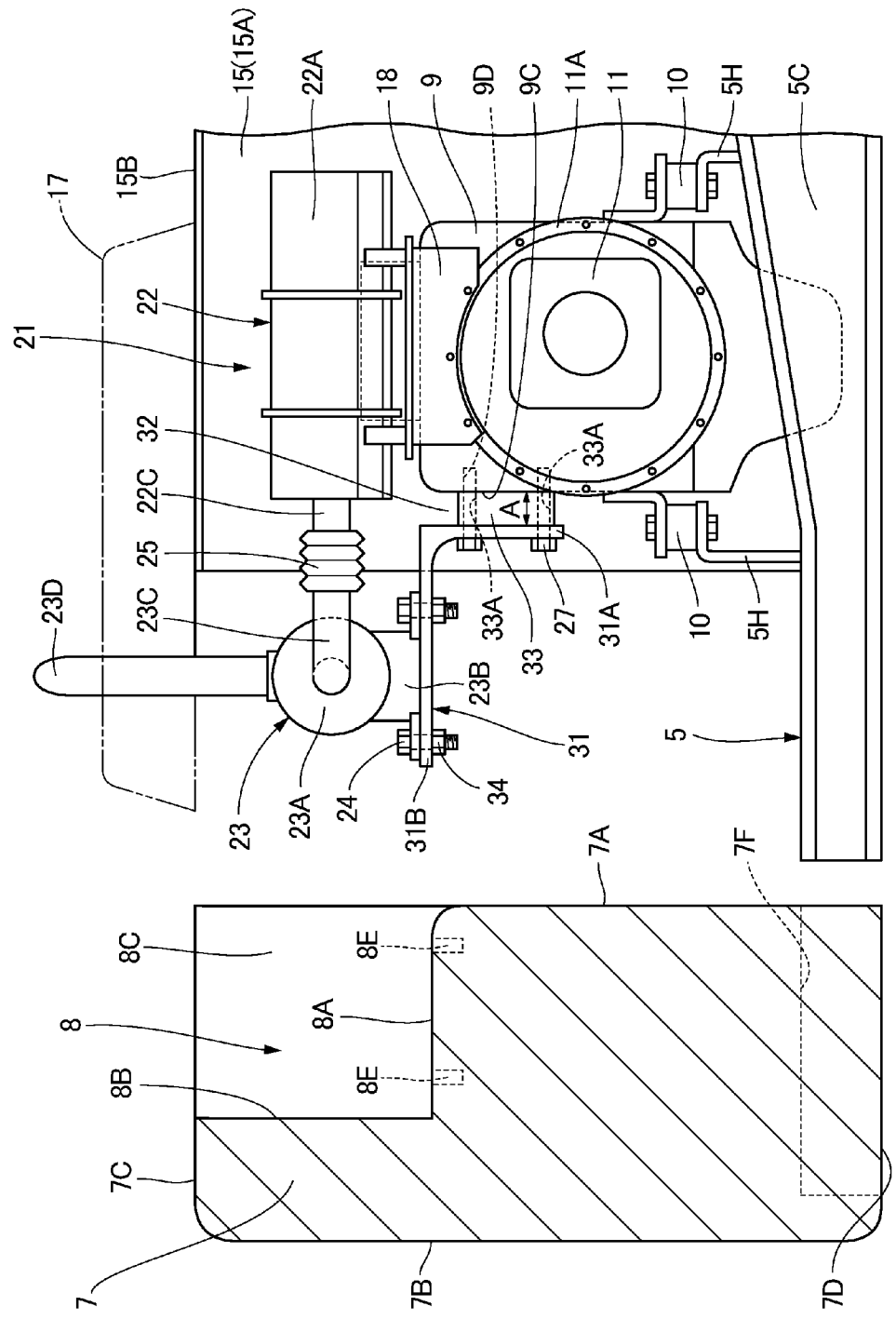
FIG. 9 is a sectional view illustrating a state in which the counterweight is removed from the revolving frame and the treatment device support bracket and the NOx purifying device are mounted on the engine.
Figure 10:
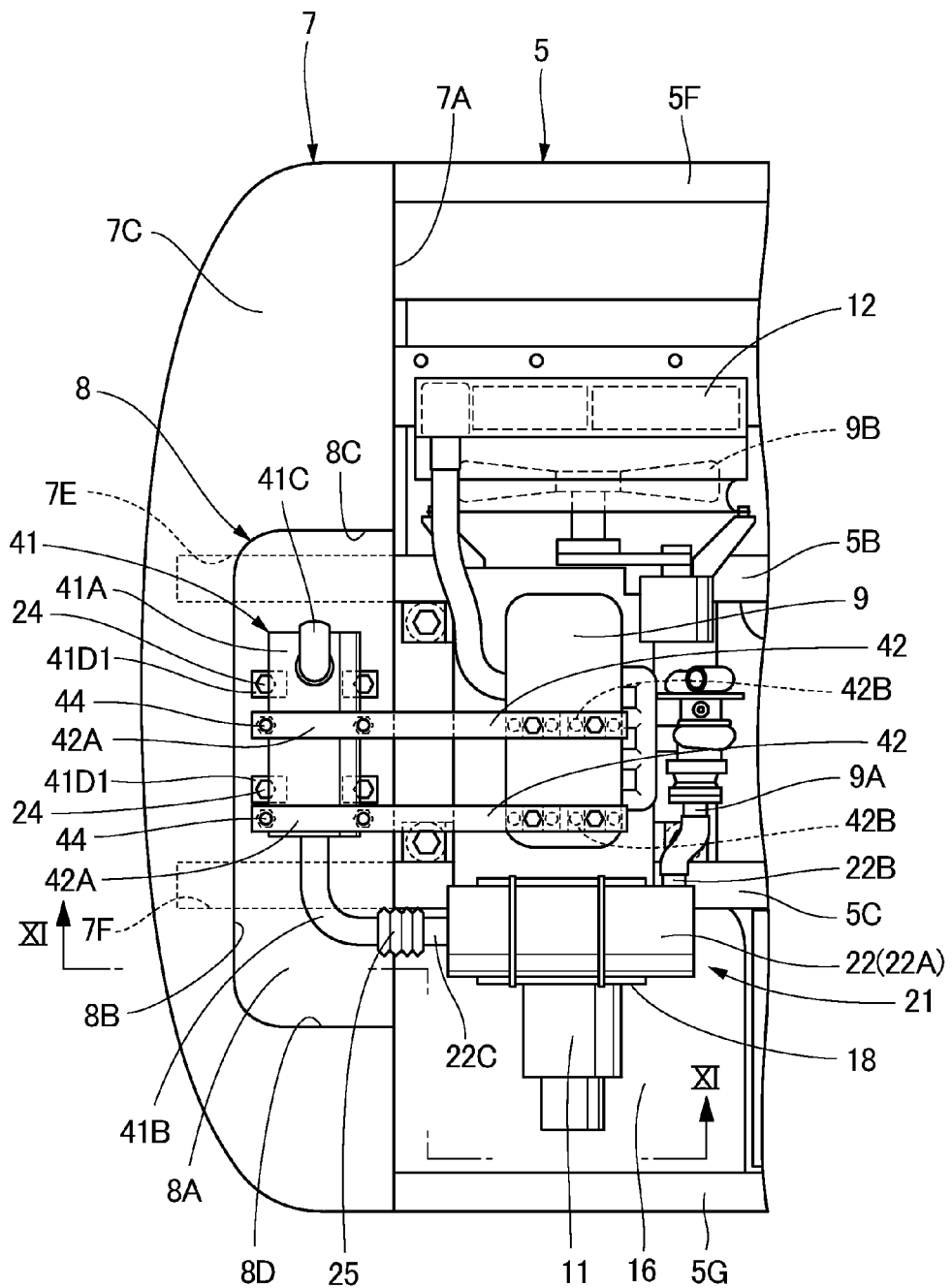
FIG. 10 is a plan view similar to FIG. 3 illustrating the treatment device support bracket, the PM trapping filter device, and the NOx purifying device according to a third embodiment.
Figure 11:
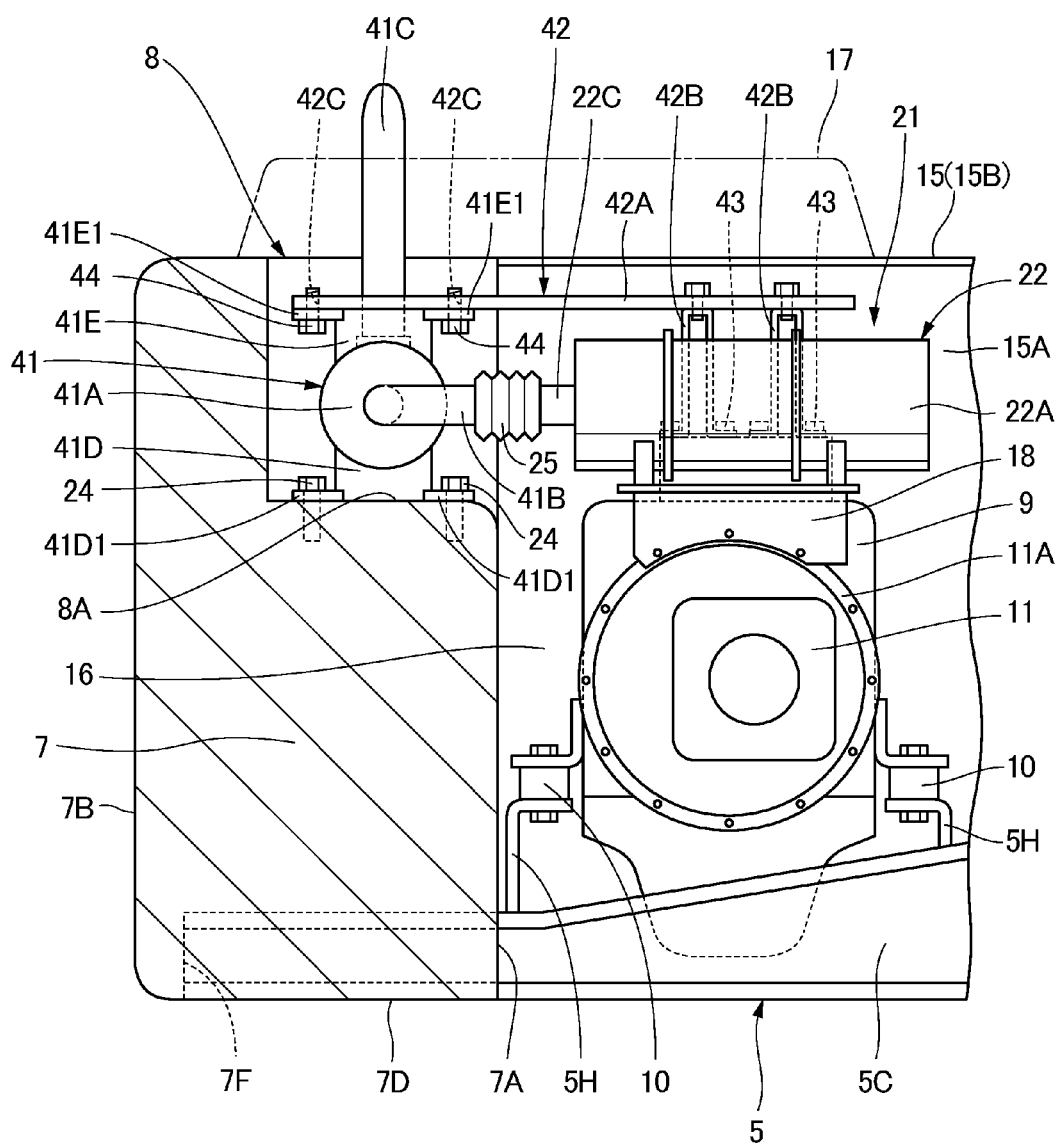
FIG. 11 is a sectional view of the treatment device support is bracket and the NOx purifying device when seen from an arrow XI-XI direction in FIG. 10.

Next, FIGS. 8 and 9 illustrate a second embodiment of the present invention. A characteristic of this embodiment is that a spacer is removably provided between the vehicle-body side fixing portion of the treatment device support bracket and the engine. It should be noted that, in this embodiment, the component elements that are identical to those of the foregoing first embodiment will be simply denoted by the same reference numerals to avoid repetitions of similar explanations.

In the figures, designated at 31 are two treatment device support brackets as treatment device support members used in the second embodiment. Each of the treatment device support brackets 31 is to mount the NOx purifying device 23 on the engine 9 when the counterweight 7 is removed from the revolving frame 5. The treatment device support bracket 31 is made of an L-shaped bent thick plate body and has a vehicle-body side fixing portion 31A and a weight-side fixing portion 31B. In the vehicle-body side fixing portion 31A, two bolt through holes 31A1 corresponding to the female screw holes 9D of the engine 9, respectively, are drilled. In the weight-side fixing portion 31B, two bolt through holes 31B1 corresponding to the mounting leg portions 23B of the NOx purifying device 23 are drilled.

Here, a state in which the counterweight 7 is mounted on the revolving frame 5 will be described. That is, the weight-side fixing portion 31B of each of the treatment device support brackets 31 is arranged between the bottom surface 8A of the recessed portion 8 provided in the counterweight 7 and the mounting leg portion 23B of the NOx purifying device 23. In this state, the bolt 24 is inserted through the mounting leg portion 23B of the NOx purifying device 23 and the bolt through hole 31B1 of the treatment device support bracket 31, and this bolt 24 is screwed with the center female screw hole 8E of the recessed portion 8. As a result, the weight-side fixing portion 31B of each of the treatment device support brackets 31 is fixed (co-tightened) to the recessed portion 8 of the counterweight 7 together with the NOx purifying device 23. In this state, a certain gap 32 is formed between the bracket fixing surface 9C of the engine 9 and the vehicle-body side fixing portion 31A of each of the treatment device support brackets 31.

Designated at 33 is a spacer, and the spacer 33 is removably mounted between the vehicle-body side fixing portion 31A of the treatment device support bracket 31 and the bracket fixing surface 9C of the engine 9. Here, the spacer 33 is formed as a rectangular block having a length dimension A in the front-rear direction equal to the gap 32 between the bracket fixing surface 9C of the engine 9 and the vehicle-body side fixing portion 31A of the treatment device support bracket 31. Moreover, in the spacer 33, two bolt through holes 33A corresponding to the bolt through holes 31A1 drilled in the vehicle-body side fixing portion 31A of the treatment device support bracket 31 are drilled. In this case, the height position of the upper surface of the weight-side fixing portion 31B when the treatment device support bracket 31 is mounted on the engine 9 and the height position of the upper surface of the weight-side fixing portion 31B when the NOx purifying device 23 is mounted on the recessed portion 8 of the counterweight 7 through the treatment device support bracket 31 are set to an equal height position.

Here, when the counterweight 7 is to be removed from the revolving frame 5, the spacer 33 is arranged in the gap 32 between the bracket fixing surface 9C of the engine 9 and the vehicle-body side fixing portion 31A of the treatment device support bracket 31. Subsequently, the bolt 27 is inserted through the bolt through hole 31A1 of the treatment device support bracket 31 and the bolt through hole 33A of the spacer 33, and this bolt 27 is screwed with the female screw hole 9D of the engine 9. Therefore, the vehicle-body side fixing portion 31A of each of the treatment device support brackets 31 can be mounted on the bracket fixing surface 9C of the engine 9 through the spacer 33. As a result, the NOx purifying device 23 is mounted on the engine 9 side, and the counterweight 7 can be removed.

The hydraulic excavator according to the second embodiment has the treatment device support bracket 31 and the spacer 33 as above, and as illustrated in FIG. 8, when the counterweight 7 is to be mounted on the revolving frame 5, the weight-side fixing portion 31B of each of the treatment device support brackets 31 is co-tightened on the recessed portion 8 of the counterweight 7 together with the NOx purifying device 23. As a result, the NOx purifying device 23 can be mounted on the recessed portion 8 of the counterweight 7 while the gap 32 is ensured between the bracket fixing surface 9C of the engine 9 and the vehicle-body side fixing portion 31A of each of the treatment device support brackets 31.

On the other hand, as illustrated in FIG. 9, when the counterweight 7 is to be removed from the revolving frame 5, the spacer 33 is arranged in the gap 32 between the bracket fixing surface 9C of the engine 9 and the vehicle-body side fixing portion 31A of the treatment device support bracket 31. In this state, the vehicle-body side fixing portion 31A of the treatment device support bracket 31 is fixed to the bracket fixing surface 9C of the engine 9 by using the bolt 27. On the other hand, the bolt 24 for co-tightening the weight-side fixing portion 31B of the treatment device support bracket 31 and the NOx purifying device 23 on the recessed portion 8 of the counterweight 7 is withdrawn from the center female screw hole 8E of the recessed portion 8. Subsequently, after the counterweight 7 is removed from the revolving frame 5, the bolt 24 is inserted through the mounting leg portion 23B of the NOx purifying device 23 and the bolt through hole 31B1 of the weight-side fixing portion 31B of the treatment device support bracket 31 again. Moreover, a nut 34 is screwed on the distal end side of the bolt 24 protruding to the lower surface side of the weight-side fixing portion 31B.

As a result, the vehicle-body side fixing portion 31A of the treatment device support bracket 31 can be mounted on the bracket fixing surface 9C of the engine 9 through the spacer 33, and the NOx purifying device 23 can be mounted on the weight-side fixing portion 31B of each of the treatment device support brackets 31. Therefore, the treatment device support bracket 31 can be fixed to the engine 9 in a state in which the NOx purifying device 23 is mounted on the weight-side fixing portion 31B of the treatment device support bracket 31.

Moreover, in the second embodiment, when the counterweight 7 is to be removed from the revolving frame 5, the vehicle-body side fixing portion 31A of the treatment device support bracket 31 is mounted on the engine 9 through the spacer 33. Thereby, in a state in which the weight-side fixing portion 31B of the treatment device support bracket 31 is mounted on the counterweight 7 and also, in a state in which the NOx purifying device 23 is supported by the treatment device support bracket 31, the vehicle-body side fixing portion 31A of the treatment device support bracket 31 can be mounted on the engine 9 through the spacer 33. Therefore, when the counterweight 7 is to be removed from the revolving frame 5, the weight of the NOx purifying device 23 can be supported by each of the treatment device support brackets 31. As a result, the work of lifting the NOx purifying device 23 by using a crane or the like, for example, can be made unnecessary, and the workability when the counterweight 7 is mounted on/removed from the revolving frame 5 can be enhanced.

Next, FIGS. 10 to 13 illustrate a third embodiment of the present invention. A characteristic of this embodiment is that a first mounting leg portion mounted on the counterweight and a second mounting leg portion arranged at a position different from that of the first mounting leg portion are provided on the treatment device. It should be noted that, in this embodiment, the component elements that are identical to those of the foregoing first embodiment will be simply denoted by the same reference numerals to avoid repetitions of similar explanations.

In the figures, designated at 41 is an NOx purifying device according to the third embodiment. This NOx purifying device 41 is composed of, similarly to the NOx purifying device 23 in the above described first embodiment, a cylindrical case 41A having a cylindrical shape, a urea water injection valve provided in this cylindrical case 41A, and a selective reduction catalyst (none of them is shown). On the right end portion of the cylindrical case 41A, an inlet pipe 41B connected to the outlet pipe 22C of the PM trapping filter device 22 is provided through the vibration absorbing pipe 25. On the upper surface on the left end side of the cylindrical case 41A, an outlet pipe 41C for exhausting the exhaust gas purified in the NOx purifying device 41 is installed upright.

Here, on the lower surface side of the cylindrical case 41A, two first mounting leg portions 41D are provided by being spaced apart in the left-right direction. Each of the first mounting leg portions 41D has a projecting portion 41D1 having a bolt through hole projecting in the front-rear direction. Here, by screwing the bolt 24 inserted through each of the projecting portions 41D1 of the first mounting leg portion 41D with the center female screw hole 8E of the recessed portion 8 of the counterweight 7, the NOx purifying device 41 is fixed to the bottom surface 8A of the recessed portion 8. On the other hand, on the upper surface side of the cylindrical case 41A, two second mounting leg portions 41E are provided by being spaced apart in the left-right direction. Each of the second mounting leg portions 41E has a projecting portion 41E1 having a bolt through hole projecting in the front-rear direction. Here, the second mounting leg portion 41E is mounted on a treatment device support bracket 42 which will be described later when the counterweight 7 is to be removed from the revolving frame 5.

Figure 12:
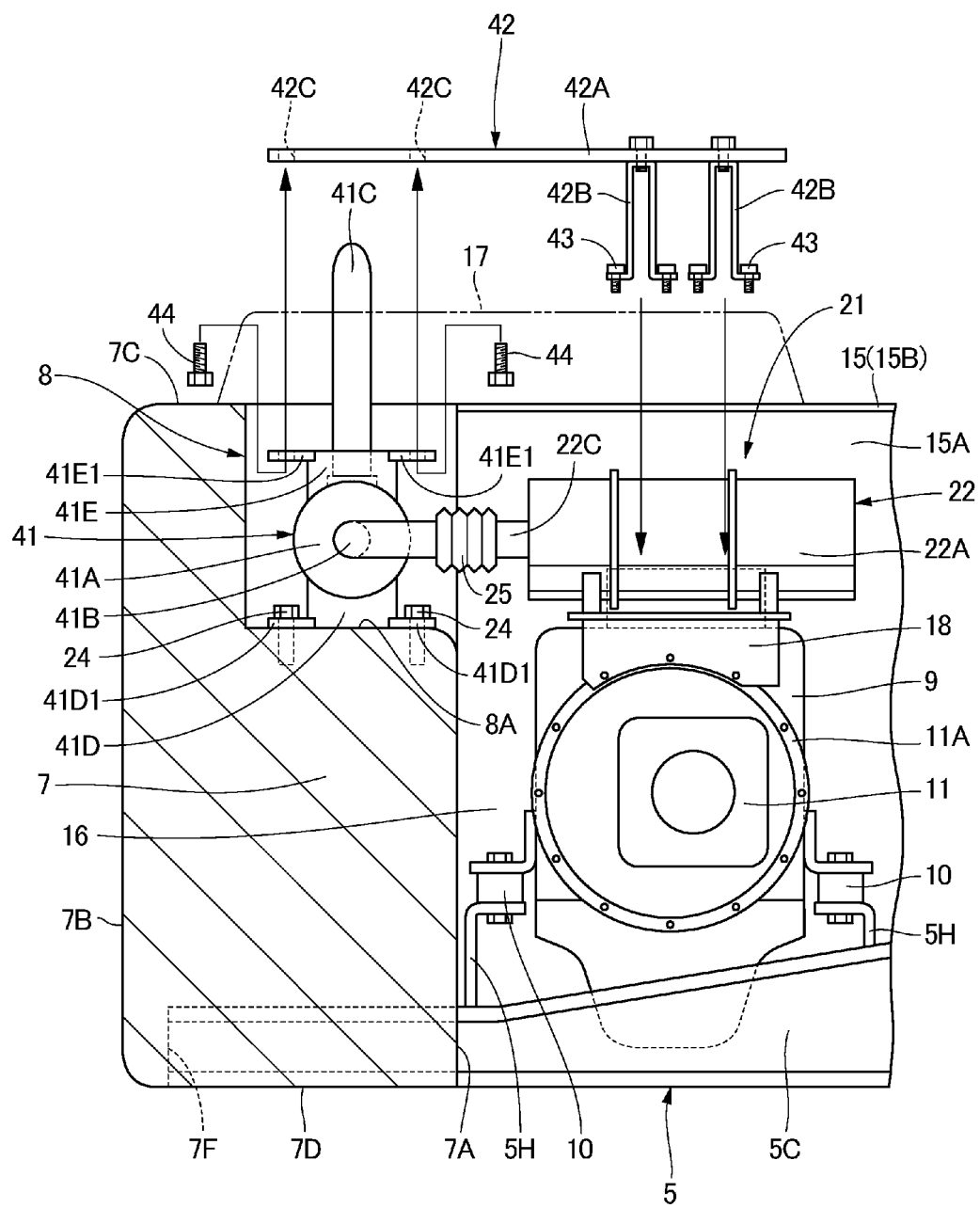
FIG. 12 is a sectional view illustrating a state in which the treatment device support bracket is mounted on the engine and the NOx purifying device.
Figure 13:
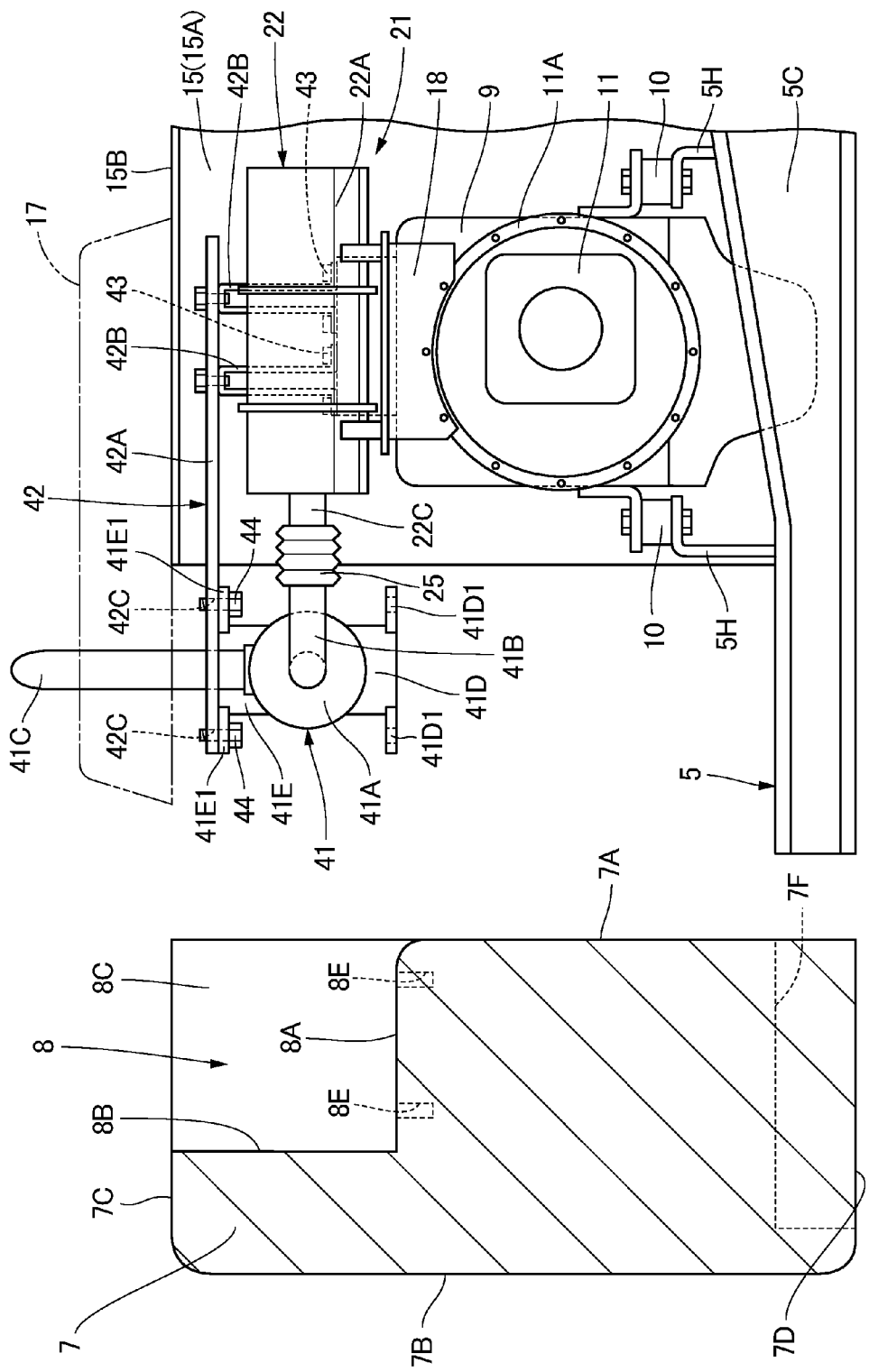
FIG. 13 is a sectional view illustrating a state in which the counterweight is removed from the revolving frame and the NOx purifying device is mounted on the engine through the treatment device support bracket.

Designated at 42 are the two treatment device support brackets as the treatment device support member used in the third embodiment. Each of these treatment device support brackets 42 is to mount the NOx purifying device 41 on the engine 9 when the counterweight 7 is removed from the revolving frame 5. As illustrated in FIG. 12, the treatment device support bracket 42 is composed of an elongated flat plate-shaped support arm portion 42A extending in the front-rear direction and arranged between the engine 9 and the counterweight 7, a vehicle-body side fixing portion 42B provided on the front side of the support arm portion 42A, and two female screw holes 42C as a weight-side fixing portion provided on the rear side of the support arm portion 42A.

In this case, the vehicle-body side fixing portion 42B of the treatment device support bracket 42 is formed of a pair of frame bodies, each being bent in an inverted U-shape. It is so configured that the upper end portion of this vehicle-body side fixing portion 42B is fixed to the front end side of the support arm portion 42A, and the lower end portion of the vehicle-body side fixing portion 42B is mounted on the upper surface side of the engine 9 by using a bolt 43 (See FIG. 12). On the other hand, the two female screw holes 42C provided on the rear side of the treatment device support bracket 42 are arranged at positions corresponding to the second mounting leg portions 41E of the NOx purifying device 41. Therefore, it is so configured that the NOx purifying device 41 is mounted on the rear end side of the treatment device support bracket 42 by screwing a bolt 44 inserted through the projecting portion 41E1 of this second mounting leg portion 41E with the female screw hole 42C.

The hydraulic excavator according to the third embodiment has the above described NOx purifying device 41 and the treatment device support bracket 42, and as illustrated in FIG. 12, when the counterweight 7 is to be mounted on the revolving frame 5, the first mounting leg portion 41D of the NOx purifying device 41 can be mounted on the bottom surface 8A of the recessed portion 8 provided in the counterweight 7 by using the bolt 24.

On the other hand, when the counterweight 7 is to be removed from the revolving frame 5, as illustrated in FIG. 12, the lower end portion of the vehicle-body side fixing portion 42B constituting the treatment device support bracket 42 is fixed to the upper surface side of the engine 9 by using the bolt 43. On the other hand, the bolt 44 inserted through the second mounting leg portion 41E of the NOx purifying device 41 is screwed with the female screw hole 42C threadedly provided in the support arm portion 42A of the treatment device support bracket 42. As a result, the second mounting leg portion 41E of the NOx purifying device 41 can be mounted on the engine 9 through the treatment device support bracket 42.

In this state, the bolt 24 is withdrawn from the first mounting leg portion 41D of the NOx purifying device 41, and in the state in which the NOx purifying device 41 is separated from the recessed portion 8 of the counterweight 7, the counterweight 7 is removed from the revolving frame 5. As a result, the NOx purifying device 41 can be supported on the engine 9 through the treatment device support bracket 42.

As described above, in the third embodiment, when the counterweight 7 is to be removed from the revolving frame 5, the second mounting leg portion 41E of the NOx purifying device 41 can be mounted in advance on the engine 9 through each of the treatment device support brackets 42. As a result, the NOx purifying device 41 can be removed from the counterweight 7 in a state in which the weight of the NOx purifying device 41 is reliably supported by each of the treatment device support brackets 42, and thus, workability of mounting/removing the counterweight 7 on/from the revolving frame 5 can be further enhanced.

Figure 14:
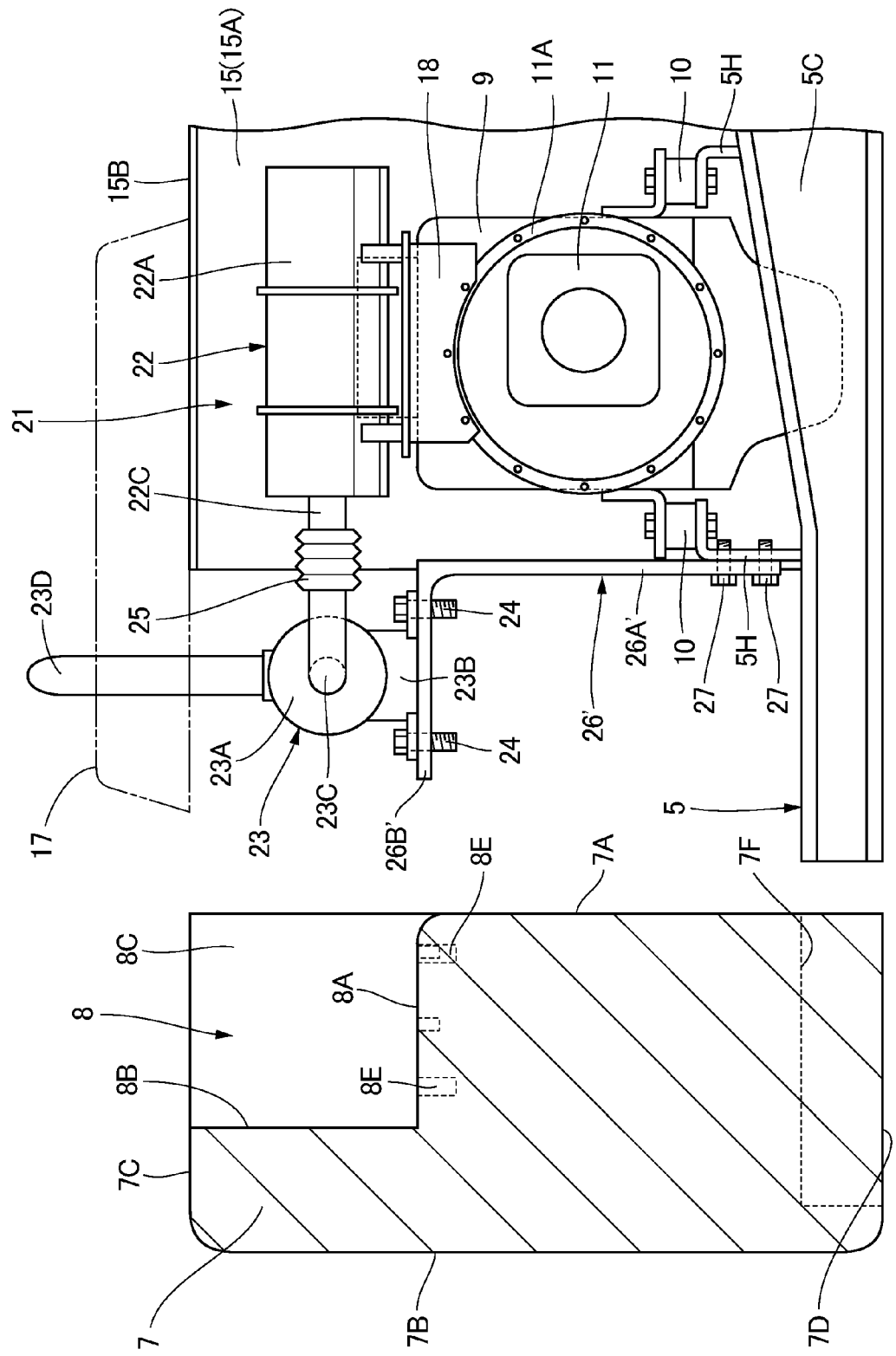
FIG. 14 is a sectional view similar to FIG. 5 illustrating a first modification in which the NOx purifying device is mounted on the revolving frame through the treatment device support bracket.

It should be noted that, in the above described first embodiment, the case in which the bracket fixing surface 9C is provided on a portion opposite to the counterweight 7 in the engine 9, and the vehicle-body side fixing portion 26A of the treatment device support bracket 26 is mounted on this bracket fixing surface 9C is exemplified. However, the present invention is not limited to that and may be so configured that a treatment device support bracket 26' according to a first modification illustrated in FIG. 14, for example, is used. That is, it may be so configured that a vehicle-body side fixing portion 26A' of the treatment device support bracket 26' is formed having a length dimension longer than the first embodiment, and this vehicle-body side fixing portion 26A' is mounted on the engine support leg portion 5H of the revolving frame 5. It should be noted that a weight-side fixing portion 26B' has the same shape as that of the first embodiment. This also applies to the second and third embodiments.

On the other hand, in the first embodiment, the exhaust gas post-treatment device 21 configured by connecting two is treatment devices in series, that is, the PM trapping filter device 22 and the NOx purifying device 23, is explained as an example. However, the present invention is not limited to that and may be applied to an exhaust gas post-treatment device configured by any one of treatment devices, that is, the PM trapping filter device 22 and the NOx purifying device 23, for example.

Figure 15:
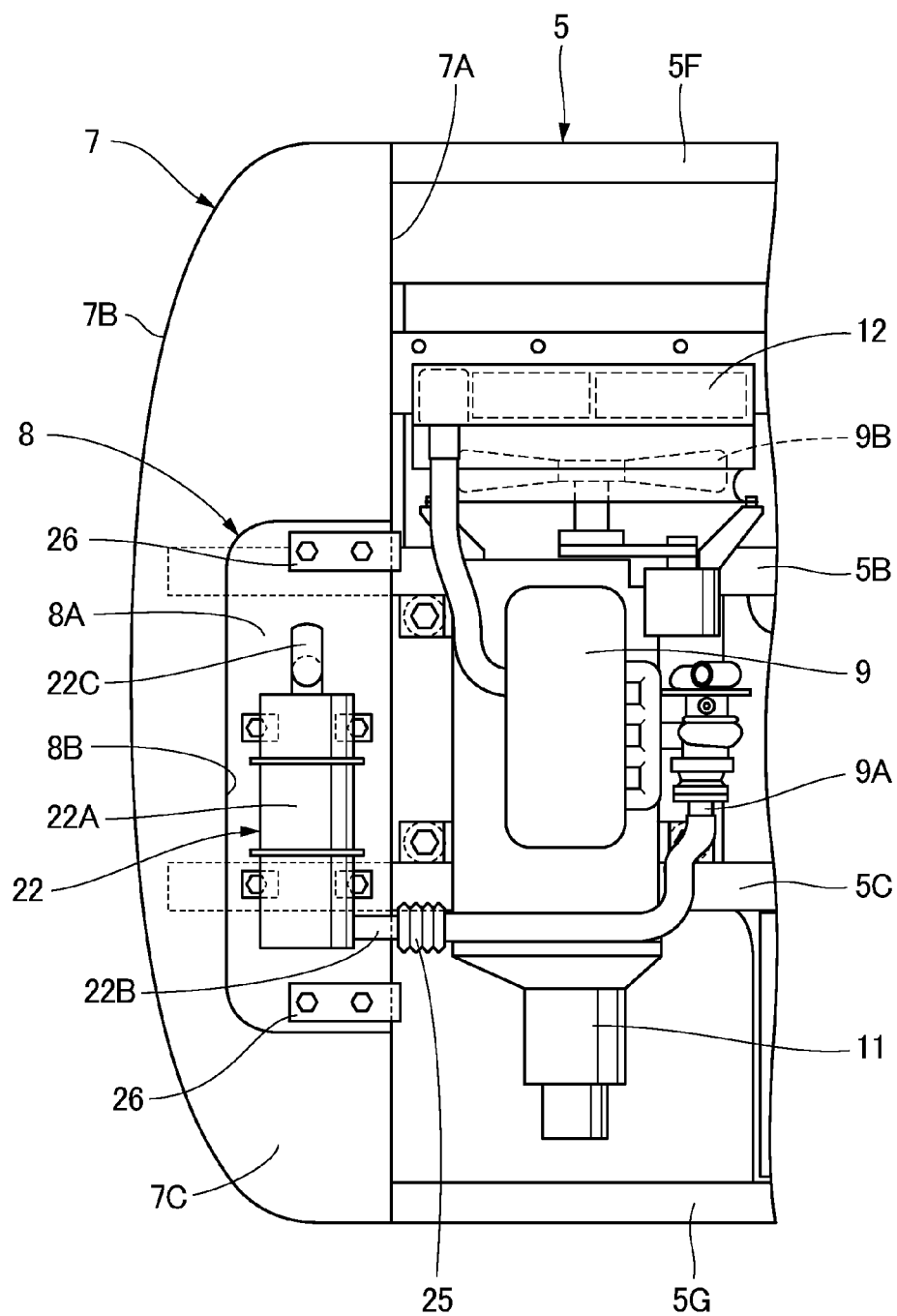
FIG. 15 is a plan view similar to FIG. 3 illustrating a second modification in which the PM trapping filter device is mounted on the counterweight.

That is, as in a second modification illustrated in FIG. 15, for example, it may be so configured that only the PM trapping filter device 22 is mounted on the recessed portion 8 of the counterweight 7. Therefore, when the counterweight 7 is to be removed from the revolving frame 5, it is only necessary that the treatment device support bracket 26 is mounted on the engine 9, and the PM trapping filter device 22 is supported on the engine 9 through the treatment device support bracket 26. This also applies to the second and third embodiments.

Moreover, the present invention may be also applied to an exhaust gas post-treatment device configured by connecting three or more treatment devices, that is, the PM trapping filter device 22, the NOx purifying device 23, and another treatment device such as an oxidation catalyst or the like. In this case, the PM trapping filter device 22 is mounted on the engine 9, and the NOx purifying device 23 and another treatment device such as an oxidation catalyst or the like can be mounted on the counterweight 7, for example.

Moreover, in each of the above described embodiments, the case in which the exhaust gas post-treatment device 21 is mounted on the hydraulic excavator 1 is exemplified, but the present invention is not limited to that and can be widely applied to other construction machines such as a wheel loader, a hydraulic crane, a dump truck and the like, for example, as long as it is a construction machine on which an engine is mounted.

DESCRIPTION OF REFERENCE NUMERALS

1: Hydraulic excavator (Construction machine)
2: Lower traveling structure (Vehicle body)
3: Upper revolving structure (Vehicle body)
4: Working mechanism
7: Counterweight 8F: Left female screw hole (Support member storage portion)
8G: Right female screw hole (Support member storage portion)
9: Engine
9A: Exhaust pipe
21: Exhaust gas post-treatment device
22: PM trapping filter device (Treatment device)
23, 41: NOx purifying device (Treatment device)
26, 31, 42, 26': Treatment device support bracket (Treatment device support member)
26A, 31A, 42B, 26A': Vehicle-body side fixing portion
26B, 31B, 26B': Weight-side fixing portion
32: Gap
33: Spacer
41D: First mounting leg portion
41E: Second mounting leg portion
42A: Support arm portion
42C: Female screw hole (Weight-side fixing portion)

The invention claimed is:

1. A construction machine comprising:
an automotive vehicle body;
a working mechanism provided on the front part side of said vehicle body;
a counterweight removably provided on the rear part side of said vehicle body in order to hold weight balance with said working mechanism;
an engine mounted on said vehicle body located on the front side of said counterweight; and
an exhaust gas post-treatment device provided along an exhaust gas passage of said engine to apply purification treatment to an exhaust gas of said engine, the exhaust gas post-treatment device configured by one or more treatment devices,
wherein at least one of the treatment devices has mounting leg portions fixed to said counterweight when said counterweight is mounted on said vehicle body, and
a treatment device support member is disposed to support said at least one of the treatment devices when said counterweight is removed from said vehicle body, and said treatment device support member is disposed on one of said engine and said vehicle body.

2. The construction machine according to claim 1, wherein said treatment device support member has a vehicle-body side fixing portion to be fixed to said one of said engine and said vehicle body and a weight-side fixing portion extending from said vehicle-body side fixing portion toward said counterweight; and when said counterweight is to be removed from said vehicle body, said vehicle-body side fixing portion of said treatment device support member is mounted on said one of said engine and said vehicle body, and said at least one of the treatment devices is mounted on said weight-side fixing portion of said treatment device support member.

3. The construction machine according to claim 1, wherein a support member storage portion for storing said treatment device support member, when removed from said one of said engine and said vehicle body, is provided on said counterweight when said counterweight is mounted on said vehicle body.

4. The construction machine according to claim 2, wherein between said one of said engine and said vehicle body and said vehicle-body side fixing portion of said treatment device support member, a spacer is removably mounted therebetween;
when said counterweight is removed from said vehicle body, said vehicle-body side fixing portion of said treatment device support member is mounted on said one of said engine and said vehicle body through said spacer, and said at least one of the treatment devices is mounted on said weight-side fixing portion of said treatment device support member; and
when said counterweight is mounted on said vehicle body, a gap is formed between said vehicle-body side fixing portion of said treatment device support member and said one of said engine and said vehicle body by removing said spacer, and said weight-side fixing portion of said treatment device support member is mounted on said counterweight together with said at least one of the treatment devices.

5. The construction machine according to claim 1, wherein on said at least one of the treatment devices, a first mounting leg portion mounted on said counterweight when said counterweight is mounted on said vehicle body and a second mounting leg portion arranged at a position different from that of said first mounting leg portion are provided;
said treatment device support member has a support arm portion arranged by extending in the front-rear direction between said engine and said counterweight, said vehicle-body side fixing portion provided on the front side of said support arm portion and fixed to said one of said engine and said vehicle body, and a weight-side fixing portion provided on the rear side of said support arm portion and fixed to said second mounting leg portion said at least one of the treatment devices; and
when said counterweight is to be removed from said vehicle body, said first mounting leg portion of said at least one of the treatment devices is removed from said counterweight, and said second mounting leg portion is mounted on said weight-side fixing portion of said treatment device support member.

* * * * *